(12) United States Patent
Thoi et al.

(10) Patent No.: US 12,107,210 B2
(45) Date of Patent: Oct. 1, 2024

(54) LITHIUM-SULFUR AND SODIUM-SULFUR BATTERY CATHODES

(71) Applicant: The Johns Hopkins University, Baltimore, MD (US)

(72) Inventors: Van Sara Thoi, Baltimore, MD (US); Avery E. Baumann, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 793 days.

(21) Appl. No.: 17/051,764

(22) PCT Filed: Apr. 29, 2019

(86) PCT No.: PCT/US2019/029597
§ 371 (c)(1),
(2) Date: Oct. 29, 2020

(87) PCT Pub. No.: WO2019/212944
PCT Pub. Date: Nov. 7, 2019

(65) Prior Publication Data
US 2021/0126259 A1 Apr. 29, 2021
US 2021/0408549 A9 Dec. 30, 2021

Related U.S. Application Data

(60) Provisional application No. 62/664,371, filed on Apr. 30, 2018.

(51) Int. Cl.
*H01M 10/054* (2010.01)
*H01M 4/02* (2006.01)
(Continued)

(52) U.S. Cl.
CPC ......... *H01M 10/054* (2013.01); *H01M 4/136* (2013.01); *H01M 4/364* (2013.01);
(Continued)

(58) Field of Classification Search
None
See application file for complete search history.

(56) References Cited

U.S. PATENT DOCUMENTS

2017/0207446 A1   7/2017   Kang et al.

FOREIGN PATENT DOCUMENTS

| CN | 102738510 A | 10/2012 |
|----|-------------|---------|
| CN | 103236542 A | 8/2013 |

(Continued)

OTHER PUBLICATIONS

Baumann et al., "Lithiated Defect Sites in Zr Metal-Organic Framework for Enhanced Sulfur Utilization in Li—S Batteries", ACS Applied Material Interfaces, Dec. 21, 2018 [retrieved on Jun. 12, 2019], vol. 11, No. 21, Retrieved from the Internet: <URL: https://pubs.acs.org/doi/10.1021/acsami.8b19034> abstract.

(Continued)

*Primary Examiner* — Robert S Carrico
(74) *Attorney, Agent, or Firm* — Armstrong Teasdale LLP

(57) ABSTRACT

Provided are lithium-sulfur batteries and ambient temperature sodium-sulfur batteries comprising defected material organic framework moieties that provide for improved absolute capacity and improved capacity retention. In some aspects, lithium-sulfur batteries and ambient temperature sodium-sulfur batteries comprise a cathode comprising defected metal organic framework moieties.

10 Claims, 20 Drawing Sheets

UiO-66                    UiO-66(50Benz)                    Li-UiO-66(50Benz)

(51) Int. Cl.
- *H01M 4/136* (2010.01)
- *H01M 4/36* (2006.01)
- *H01M 4/38* (2006.01)
- *H01M 4/58* (2010.01)
- *H01M 4/60* (2006.01)
- *H01M 10/052* (2010.01)

(52) U.S. Cl.
CPC ............. *H01M 4/38* (2013.01); *H01M 4/382* (2013.01); *H01M 4/58* (2013.01); *H01M 4/60* (2013.01); *H01M 10/052* (2013.01); *H01M 2004/028* (2013.01); *H01M 2300/0082* (2013.01)

(56) References Cited

FOREIGN PATENT DOCUMENTS

| | | | |
|---|---|---|---|
| CN | 105070946 | A | 11/2015 |
| CN | 105633418 | A | 6/2016 |
| CN | 106684355 | A * | 5/2017 |
| JP | 2015145454 | A | 8/2015 |
| WO | 2017152171 | A1 | 9/2017 |

OTHER PUBLICATIONS

Baumann et al., "Promoting sulfur adsorption using surface Cu sites in metal-organic frameworks for lithium sulfur batteries", Journal of Materials Chemistry A, Feb. 22, 2018 (retrieved on Jun. 11, 2019), vol. 6, No. 22; Retrieved from the Internet: <URL: https://facultystaff.richmond.edu/-sabrash/Outside%20Speaker%20Papers%202018-2019/Sara%20Thoi%20paper%201.pdf>, pp. 4811-4821.

Tang et al., "Mechanism of electrochemical lithiation of a metal-organic framework without redox-active nodes", The Journal of Chemical Physics, May 17, 2016 [retrieved on Jun. 12, 2019], vol. 144, No. 17, Retrieved from the Internet: <URL: https://www.osti.gov/pages/servlets/purl/1471092> entire document.

International Search Report and Written Opinion for International Application No. PCT/US2019/029597, mailed Jul. 5, 2019, 11 pages.

* cited by examiner

COIN CELL CASE

SS CONICAL SPRING

SS SPACER - 18mm

CATHODE - 15mm

CELGARD POLYMER SEPARATOR

POLISHED Li METAL - 10mm

SS SPACER - 18mm

COIN CELL CASE

LITHIUM-SULFUR AND SODIUM-SULFUR BATTERY CATHODES

CROSS-REFERENCE TO RELATED APPLICATIONS

This application is the 35 U.S.C. § 371 U.S. National Phase of International Patent Application No. PCT/US2019/029597, filed Apr. 29, 2019, which claims priority to U.S. Provisional Application No. 62/664,371 filed 30 Apr. 2018, the contents of which are incorporated by reference in their entirety.

BACKGROUND OF THE INVENTION

The field of the invention relates generally to high capacity lithium-sulfur batteries and ambient temperature sodium sulfur batteries.

Lithium sulfur (Li—S) batteries have emerged as a promising contender to Li-ion batteries based on a high energy density of about 2600 Wh kg$^{-1}$ as compared to about 300 Wh·kg$^{-1}$ in typical Li-ion batteries. Furthermore, sulfur is an abundant and inexpensive raw material and can solve supply and cost issues associated LiCoO$_2$ cathodes in Li-ion batteries.

Li—S batteries comprise a cathode comprising sulfur, an anode comprising lithium, and an electrolyte. During the battery discharge cycle, polysulfides are reduced on the cathode surface, such as according to the following sequence:

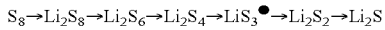

During the battery charging cycle, polysulfides are formed at the cathode, such as according to the following sequence:

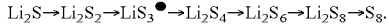

More particularly, during a typical discharge cycle in Li—S batteries, the energy is derived from the oxidation of the Li anode to form Li$^+$ ions. These Li ions migrate across the electrolyte to the sulfur cathode (such as sulfur/carbon composites) and charge balances the reduction of sulfur to polysulfides Li$_2$S$_x$ (where x=1-8).

While the Li—S conversion chemistry promotes a high theoretical charge capacity of about 1680 mAh g$^{-1}$, problematically there are significant challenges in Li—S devices that have hindered commercialization. For instance, sulfur is a poor conductor of both ions and electrons, which attenuates the maximum capacity of the battery. Further, dissolution into the electrolyte of polysulfides from the sulfur cathode leads to a depletion of active sulfur and the formation of insoluble and insulating sulfide species on the surface of the anode and the cathode during repeated charge and discharge cycles. This phenomenon, termed the "polysulfide shuttle," results in irreversible capacity loss and poor battery cycle life.

To address problems associated with Li—S batteries, a variety of cathode materials have been studied to enhance conductivity and maximum charge capacity. For instance, Li$_2$S has been demonstrated to improve Li ion conductivity and yield high sulfur utilization (defined as the amount of accessible sulfur for redox chemistry). The Li-rich cathode provides existing Li$^+$ sites for promoting ion conduction. See, for instance: Z. Lin, et al., *Lithium Superionic Sulfide Cathode for All-Solid Lithium-Sulfur Batteries*, ACS Nano, 2013, 7, 2829-2833; and L. Wang, et al., *A high performance lithium-ion sulfur battery based on a Li$_2$S cathode using a dual-phase electrolyte*, Energy Environ. Sci., 2015, 8, 1551-1558. However, Li$_2$S cathodes still suffer from polysulfide leaching and high overpotentials. Further, attempts to incorporate solid-state lithium thiophosphate materials within the electrode to provide high ionic conductivity have proved to be impractical because of material instability. See, for instance, Z. Lin, et al., *Lithium polysulfidophosphates: a family of lithium-conducting sulfur-rich compounds for lithium-sulfur batteries*, Angew. Chem. Int. Ed. Engl., 2013, 52, 7460-3.

Ambient temperature (room temperature) sodium-sulfur batteries (RT Na—S) are likewise promising due to high theoretical energy density and low cost. Moreover, as compared to lithium batteries, RT Na—S batteries avoid the use of relatively expensive Li in favor of Na.

RT Na—S batteries comprise a cathode comprising sulfur, an anode comprising sodium metal, and an electrolyte. During the battery discharge cycle, polysulfides are reduced on the cathode surface and during the battery charging cycle, polysulfides are formed at the cathode as follows:

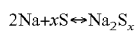

As with Li—S batteries, there are significant challenges in RT Na—S devices that have hindered commercialization such as achieving charge capacity close to theoretical and retaining charge with repeated cycling.

A need in the art therefore exists for Li—S batteries and RT Na—S batteries having improved capacity and charge retention.

BRIEF DESCRIPTION OF THE INVENTION

In one aspect of the disclosure, a battery cathode is provided. The cathode comprises a plurality of defected metal organic framework moieties: (i) wherein each defected metal organic framework moiety independently comprises at least one defect selected from a structural defect and a compositional feature; and (ii) wherein each defect independently allows for capture of battery anode metal ions, incorporation of chemical anchor substituents for capture of polysulfides, or a combination thereof.

In another aspect of the disclosure, a lithium-sulfur battery is provided. The battery comprises: (i) an anode comprising lithium; (ii) an electrolyte; and (iii) a cathode comprising sulfur and a plurality of defected metal organic framework moieties, (1) wherein each defected metal organic framework moiety independently comprises at least one defect selected from a structural defect and a compositional feature; and (2) wherein each defect independently allows for capture of battery anode metal ions or incorporation of chemical anchor substituents for capture of polysulfides.

In yet another aspect of the disclosure, a solid material having lithium conductivity is provided. The solid material comprises lithium and a plurality of defected metal organic framework moieties: (i) wherein each defected metal organic framework moiety independently comprises a defect selected from a metal coordination site, a compositional feature and a protic site; and (ii) wherein the lithium is bound to or captured by the defect.

In still another aspect of the present disclosure, a method of using a lithium-sulfur battery is provided. The method comprises providing a lithium-sulfur battery, said battery having a charge cycle and a discharge cycle. In some aspects: (1) the battery comprises (a) an anode comprising lithium, (b) an electrolyte, and (c) a cathode comprising sulfur and a plurality of defected metal organic framework moieties comprising at least one defect selected from a structural defect and a compositional feature wherein each defect independently allows for capture of lithium ions; (2) the discharge cycle comprises reducing elemental sulfur and/or lithium polysulfides to lithium sulfide at the cathode, wherein at least a portion of the lithium polysulfides is captured by the defected metal organic framework moieties; and (3) the charge cycle comprises oxidizing lithium sulfide to lithium polysulfides and/or elemental sulfur at the cathode, wherein at least a portion of the lithium polysulfides in the oxidation reaction is the lithium polysulfides captured in the discharge cycle. In some aspects: (1) the lithium-sulfur battery comprises (a) an anode comprising lithium, (b) an electrolyte, and (c) a cathode comprising sulfur and a plurality of defected metal organic framework moieties comprising at least one defect selected from a chemical anchor substituent capable of functionalizing polysulfides thereto and a metal coordination site; (2) the discharge cycle comprises reducing elemental sulfur and/or lithium polysulfides to lithium sulfide at the cathode, wherein at least a portion of the polysulfides are captured by functionalization to the metal organic framework chemical anchor sites; and (3) the charge cycle comprises oxidizing lithium sulfide to lithium polysulfides and/or elemental sulfur at the cathode, wherein at least a portion of the lithium polysulfides in the oxidation reaction is the lithium polysulfides captured in the discharge cycle. In some aspects: (1) the lithium-sulfur battery comprises (a) an anode comprising lithium, (b) an electrolyte, and (c) a cathode comprising sulfur and (I) a plurality of defected metal organic framework moieties comprising at least one defect selected from a structural defect and a compositional feature wherein each defect independently allows for capture of lithium ions and (II) and a plurality of defected metal organic framework moieties comprising at least one defect selected from a chemical anchor substituent capable of functionalizing polysulfides thereto and a metal coordination site; (2) the discharge cycle comprises reducing elemental sulfur and/or lithium polysulfides to lithium sulfide at the cathode wherein at least a portion of the lithium polysulfides are captured by functionalization to the metal organic framework chemical anchor sites; and (3) the charge cycle comprises oxidizing lithium sulfide to lithium polysulfides and/or elemental sulfur at the cathode wherein at least a portion of the lithium polysulfides in the oxidation reaction is the lithium polysulfides captured in the discharge cycle.

In yet another aspect of the present disclosure, an ambient temperature sodium-sulfur battery is provided. The battery comprises: (i) an anode comprising sodium; (ii) an electrolyte; and (iii) a cathode comprising sulfur and a plurality of defected metal organic framework moieties, (1) wherein each defected metal organic framework moiety independently comprises at least one defect selected from a structural defect and a compositional feature, and (2) wherein each defect independently allows for capture of battery anode metal ions or incorporation of chemical anchor substituents for capture of polysulfides.

In another aspect of the disclosure, a solid material having sodium conductivity is provided. The material comprises sodium and a plurality of defected metal organic framework moieties: (i) wherein each defected metal organic framework moiety independently comprises a defect selected from a metal coordination site, a compositional feature and a protic site; and (ii) wherein the sodium is bound to or captured by the defect.

In another aspect of the disclosure, a method of using an ambient temperature sodium-sulfur battery is provided. The method comprises providing a sodium-sulfur battery, said battery having a charge cycle and a discharge cycle. In some aspects: (1) the battery comprises (a) an anode comprising sodium, (b) an electrolyte, and (c) a cathode comprising sulfur and a plurality of defected metal organic framework moieties comprising at least one defect selected from a structural defect and a compositional feature wherein each defect independently allows for capture of sodium ions; (2) the discharge cycle comprises reducing elemental sulfur and/or sodium polysulfides to sodium sulfide at the cathode, wherein at least a portion of the sodium polysulfides is captured by the defected metal organic framework moieties; and (3) the charge cycle comprises oxidizing sodium sulfide to sodium polysulfides and/or elemental sulfur at the cathode, wherein at least a portion of the sodium polysulfides in the oxidation reaction is the sodium polysulfides captured in the discharge cycle. In some aspects: (1) the sodium-sulfur battery comprises (a) an anode comprising sodium, (b) an electrolyte, and (c) a cathode comprising sulfur and a plurality of defected metal organic framework moieties comprising at least one defect selected from a chemical anchor substituent capable of functionalizing polysulfides thereto and a metal coordination site; (2) the discharge cycle comprises reducing elemental sulfur and/or sodium polysulfides to sodium sulfide at the cathode, wherein at least a portion of the polysulfides are captured by functionalization to the metal organic framework chemical anchor sites; and (3) the charge cycle comprises oxidizing sodium sulfide to sodium polysulfides and/or elemental sulfur at the cathode, wherein at least a portion of the sodium polysulfides in the oxidation reaction is the sodium polysulfides captured in the discharge cycle. In some aspects: (1) the sodium-sulfur battery comprises (a) an anode comprising sodium, (b) an electrolyte, and (c) a cathode comprising sulfur and (I) a plurality of defected metal organic framework moieties comprising at least one defect selected from a structural defect and a compositional feature wherein each defect independently allows for capture of sodium ions and (II) and a plurality of defected metal organic framework moieties comprising at least one defect selected from a chemical anchor substituent capable of functionalizing polysulfides thereto and a metal coordination site; (2) the discharge cycle comprises reducing elemental sulfur and/or sodium polysulfides to sodium sulfide at the cathode wherein at least a portion of the sodium polysulfides are captured by functionalization to the metal organic framework chemical anchor sites; and (3) the charge cycle comprises oxidizing sodium sulfide to sodium polysulfides and/or elemental sulfur at the cathode wherein at least a portion of the sodium polysulfides in the oxidation reaction is the sodium polysulfides captured in the discharge cycle.

BRIEF DESCRIPTION OF THE DRAWINGS

FIG. 14 on the right axis and the associated lines of open shapes at the top of the graph depicts the Coulombic efficiency (%) versus battery cycle number for a lithium-sulfur battery of the present disclosure having a cathode comprising lithiated metal organic frameworks versus a lithium-sulfur battery having a cathode comprising a non-lithiated metal organic framework.

FIG. 18, at the lines at the top of the graph and the right axis depicts the Coulombic efficiency (%) versus cycle number at 1 C for lithium-sulfur batteries of the present disclosure having a cathode comprising lithiated metal organic frameworks (LPS-UiO-66(50Benz) and LPS-UiO-66(noMod)) versus a battery having a cathode comprising a S/C composite cathode.

DETAILED DESCRIPTION OF THE INVENTION

Figure 1:
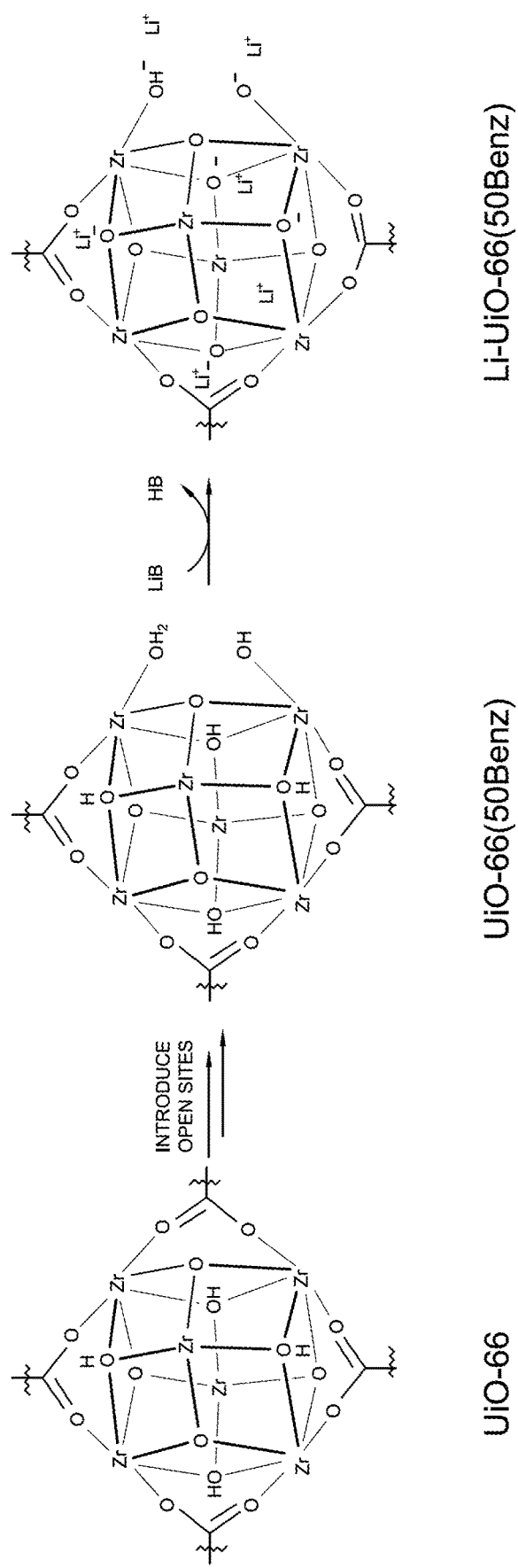
FIG. 1 depicts one aspect of the present disclosure for introducing defective sites on UiO-66 metal organic frameworks and lithiating the defected metal organic framework.

In accordance with the present disclosure, it has been discovered that Li—S batteries and RT Na—S batteries comprising defected material organic framework (MOF) moieties provide for improved absolute capacity and improved capacity retention as compared to Li—S batteries and RT Na—S batteries known in the art. In some aspects, high capacity Li—S battery cathodes comprising lithiated MOFs provide for extended Li—S cycling. In some aspects, high capacity RT Na—S battery cathodes comprising sodiated MOFs provide for extended RT Na—S cycling. In some other aspects, MOFs that are derivatized with chemical anchors provide for capture and/or encapsulation of polysulfides resulting in Li—S performance improvements through reduction of dissolution of polysulfides in the electrolyte and concomitant loss of reactive sulfur. In some other aspects, MOFs that are derivatized with the chemical anchors provide for capture and/or encapsulation of polysulfides resulting in RT Na—S performance improvements through reduction of dissolution of polysulfides in the electrolyte and concomitant loss of reactive sulfur. Li—S and RT Na—S batteries of the present disclosure achieve an order of magnitude in energy density compared to current Li-ion and RT Na—S technologies while providing for improved battery cycle life and capacity retention as compared to current Li—S and RT Na—S technologies.

In some aspects, Li—S batteries of the present disclosure have an absolute capacity of at least 800 mA h g$^{-1}$, at least 900 mAh g$^{-1}$, at least 1000 mAh g$^{-1}$, at least 1100 mAh g$^{-1}$, at least 1200 mAh g$^{-1}$, at least 1300 mAh g$^{-1}$, for instance 1320 mAh g$^{-1}$. In some aspects, Li—S batteries of the present disclosure further have an absolute capacity of at least 800 mAh g$^{-1}$, at least 900 mAh g$^{-1}$, at least 1000 mAh g$^{-1}$, at least 1100 mAh g$^{-1}$, or at least 1200 mAh g$^{-1}$, after 20 charge-discharge cycles. In some aspects, Li—S batteries of the present disclosure have a capacity retention of at least 60%, at least 65%, at least 70%, at least 75% or at least 80% after 20 charge-discharge cycles.

As used herein, a "metal node" refers to a cluster comprising two or more metal ions connected by bridging oxide and/or hydroxide ligands. Such nodes may be referred to as a secondary binding unit (SBU). A non-limiting example of a metal node is hexa-zirconium oxo-hydroxo.

As used herein, a "metal organic framework" (MOF) refers to a material that is a coordination network comprising one or more metal nodes, and clusters thereof, coordinated by organic ligands or linkers. MOFs are crystalline and may be characterized by a one-, two- or three-dimensional structure.

The MOF structures are porous. In some aspects, MOF structure may be characterized as a porous framework having voids and may be further characterized by surface area. In general, MOFs having a porosity of from about 200 m$^2$/g, 300 m$^2$/g, 400 m$^2$/g, about 500 m$^2$/g, about 600 m$^2$/g, about 700 m$^2$/g, about 800 m$^2$/g, about 900 m$^2$/g, about 1000 m$^2$/g, about 1100 m$^2$/g, about 1200 m$^2$/g, about 1300 m$^2$/g, about 1400 m$^2$/g, about 1500 m$^2$/g, or about 1600 m$^2$/g, and any range constructed from any of those values, such as from about 200 m$^2$/g to about 1600 m$^2$/g or from about 400 m$^2$/g to about 1600 m$^2$/g, is suitable for the practice of the present invention.

As used herein, an "organic ligand" or "organic linker" refers to a molecule or combination of molecules comprising at least one C—H bond and which is/are capable of binding to at least two metal nodes.

As used herein, "defected MOF" and "defect" with reference to MOFs refer to sites capable of capture/encapsulation of metal ions (e.g., Li$^r$) and/or polysulfides. Defects may be a structural defect such as a dislocation, local defect or large scale defect, where the defect results in one or more MOF voids or vacancies. Other defects may be compositional features such as metal coordination sites, protic sites (e.g., —OH and —OH$_2$) for functionalization, chemical anchors, and substituents functionalized on the organic linker. See, for instance: Z. Fang, et al., *Defect Engineered Metal-Organic Frameworks*, Agnew. Chem. Int. Ed. 2015, 54, 7234-7254; D. Pravas, et al., *MOF Functionalization via Solvent-Assisted Ligand Incorporation: Phosphonates vs Carboxylates*, Inorg. Chem. 2015, 54, 2185-2192; and G. Shearer, et al., *Functionalizing the Defects: Postsynthetic Ligand Exchange in the Metal Organic Framework UIO-66*, Chem. Mater. 2016, 28, 7190-7193, the contents of each of which are incorporated by reference herein in its entirety. In any of the various aspects of the disclosure, at least 50%, at least 75% or at least 90% by number of MOF moieties in a plurality of MOF moieties comprise at least one defect.

As used herein, and as is generally known in the art, a defect in a solid material structure may be a local defect (or point defect), a large-scale defect, or a dislocation. Point defects are generally of atomic size and may result from: the occupancy (replacement) of one or more sites in a lattice structure or a metal organic framework by an impurity (e.g., an atom or an ion) where such replacement atoms are termed extrinsic defects; a void (vacancy) due to the absence of an atom where voids are termed as an intrinsic defect; or the presence of an extra atom or extra ion at one or more lattice structure sites where no atom would normally appear, where such extra atoms are termed as an intrinsic defect. Dislocations are irregularities in within a solid material structure and result from the change in the regular ordering of atoms along a line, termed a dislocation line. A large-scale structural defect (or volume defect or a bulk defect) is generally a three-dimensional aggregate of atoms or voids large enough to affect the three dimensional (macroscopic) structure of a solid material as may be reflected in one or more solid material properties, such as structure mechanical strength, porosity, cracking, and the formation of separate small regions of homogenous and heterogeneous material (e.g., due to atom clustering).

As used herein, "functionalized MOF" refers to a MOF wherein one or more of the backbone atoms of the organic linkers carries a pendant functional group, a MOF functionalized with a chemical anchor (such as Li$_3$PS$_4$).

Metal-organic MOFs are tunable materials with the ability to incorporate functionalities through the selection of organic linkers and metal ion precursors. The high porosity of MOFs provides the ability to host and stabilize reactive sulfide species and metal ions (e.g., lithium ions), while the associated structural integrity and long-range order provides a convenient handle for the detection of intermediates using molecular spectroscopy and single-crystal and powder diffraction techniques.

Although reference herein is made to zirconium MOFs and $Li^+$ metal ions, those skilled in the art will recognize that the present disclosure is not narrowly limited and is applicable to any defected MOF suitable for capture/encapsulation of metal ions and polysulfide.

Sodium-sulfur batteries are known in the art. See, for instance and without limitation: K. Kumar, et al., *Progress and prospects of sodium sulfur batteries: A review*, Solid State Ionics 312 (2107) 8-16; A. Douglas, et al., *Ultrafine Iron Pyrite ($FeS_2$) Nanocrystals Improve Sodium-Sulfur and Lithium-Sulfur Conversion Reactions for Efficient Batteries*, ACS Nano, Vol. 9, No. 11, 11156-11165, 2015; and A. Abouimrane, *A New Class of Lithium and Sodium Rechargeable Batteries Based on Selenium and Selenium-Sulfur as a Positive Electrode*, J. Am. Chem. Soc., 2012, 134, 4505-4508. The contents of each of those references are incorporated herein in their entirety. Although further reference herein is made to Li—S batteries, those skilled in the art will recognize that the present disclosure is not narrowly limited and is applicable to RT Na—S batteries.

The metal for the MOF is suitably any metal, such as for instance and without limitation, a transition metal that provides for defected MOF suitable for capture/encapsulation of metal ions and polysulfide. In some aspects, the metal is selected from zirconium, hafnium, cerium, copper, zinc, titanium, iron, vanadium, molybdenum, niobium, and chromium, and combinations thereof. In some aspects, the metal is selected from a combination of at least two of zirconium, hafnium, cerium, copper, zinc, titanium, iron, vanadium, molybdenum, niobium, and chromium. In some aspects, the metal is zirconium.

In some non-limiting aspects of the disclosure, the MOFs are Zr-based. One example of such a Zr-MOF species is UiO-66. Another example of such as Zr-MOF species is MOF-808. In some such aspects, the MOF is a porous Zr-based MOF, and the MOF is incorporated with lithium atoms fur use as a Li-rich MOF/S cathode for Li—S batteries. Typical zirconium MOF node structures consist of a hexanuclear Zr cluster connected by bridging oxide and hydroxide ligands. In some aspects, the SBU may be formed in the presence of carboxylic acids, resulting in the generic formula of $Zr_6(\mu_3-O)_4 (\mu_3-OH)_4(RCOO)_{12}$.

In the case of UiO-66, 1,4-benzenedicarboxylic acid ($H_2BDC$) serves as a ditopic linker forming and connecting the SBUs of the MOF where all carboxylic acid sites are occupied. See J. Cavka, et al., *A new zirconium inorganic building brick forming metal organic frameworks with exceptional stability*, J Am Chem Soc. 2008, 130(42), 13850-13851, the contents of which are incorporated by reference in its entirety. Recent studies have shown that defect sites can be incorporated into the UiO-66 structure in the form of missing linkers through the use of competing carboxylic acids known as modulators. See: G. C. Shearer, et al., *Tuned to Perfection: Ironing Out the Defects in Metal-Organic Framework UiO-66*, Chem. Mater., 2014, 26, 4068-4071; G. C. Shearer, et al., *Functionalizing the Defects: Postsynthetic Ligand Exchange in the Metal Organic Framework UiO-66*, Chem. Mater., 2016, 28, 7190-7193; and G. C. Shearer, et al., *Defect Engineering: Tuning the Porosity and Composition of the Metal-Organic Framework UiO-66 via Modulated Synthesis*, Chem. Mater., 2016, 28, 3749-3761, each of which are incorporated by reference herein in its entirety. Defected UiO-66 exhibits higher BET surface area than pristine MOF (i.e., non-defected MOF) as characterized by a surface are increase of at least 5%, at least 10%, at least 15%, at least 20% or at least 25% and contain open Zr sites where an aqua and hydroxo ligand occupy the missing-linker site. These defected sites are reactive and can be further functionalized using other carboxylates or phosphates. See: G. C. Shearer, et al., Chem. Mater., 2016, 28, 7190-7193; G. C. Shearer, et al., Chem. Mater., 2016, 28, 3749-3761; S. Wang, et al., *General and Direct Method for Preparing Oligonucleotide-Functionalized Metal-Organic Framework Nanoparticles*, J Am Chem Soc, 2017, 139, 9827-9830; and P. Deria, et al., *MOF functionalization via solvent-assisted ligand incorporation: Phosphonates vs carboxylates*, Inorg. Chem., 2015, 54, 2185-2192, each of which are incorporated by reference herein in its entirety. In accordance with the present disclosure, as shown in FIG. 1, these defect sites are suitable for lithium incorporation by deprotonating available protic sites in the $H_2O$— and HO— ligand. In particular, as depicted in FIG. 1, the introduction of missing linker defects introduces additional protons that can be swapped for $Li^+$ and create additional $Li^+$ storage sites. Such a deprotonating method differs from prior art methods (such as disclosed by R. Ameloot, et al., *Ionic Conductivity in the Metal-Organic Framework UiO-66 by Dehydration and Insertion of Lithium tert-Butoxide*, Chem.—A Eur. J., 2013, 19, 5533-5536, incorporated by reference herein in its entirety) for dehydration of the Zr nodes in order to increase $Li^+$ ionic conductivity and sulfur utilization.

The node structure of Zr-MOFs features six metal atoms connected by bridging hydroxo, oxo, and carboxylate ligands. In a fully coordinated node, twelve carboxylates bridge each Zr atom to its neighboring atom and prevent interaction with guest species. If a portion of the nodal carboxylate ligands are removed, open sites become available to bind guest molecules, providing synthetic handles for the advanced functionalization of the metal node (see, e.g., FIG. 3). Certain Zr-MOFs are capable of supporting these open sites, either through the inherent crystal structure (for example, and without limitation, MOF-808) or by introducing defects using a modulated synthetic approach (for example, and without limitation, UiO-66).

In the case of MOF-808, MOF-808 is composed of hexanuclear Zr clusters with the formula of $Zr_6(\mu3-O)_4(\mu3-OH)_4(RCOO)_{12-x}(HCOO)_x$, where x=5 or 6, connected by 1,3,5-benzenetricarboxylate (BTC). The formate (HCOO) sites can be removed under HCl activation and functionalized with other carboxylic acids and chemical anchors, such as thiophosphates. Synthesis of MOF-808 has been reported. See: H. Furukawa, et al., *Water Adsorption in Porous Metal-Organic Frameworks and Related Materials*, J. Am. Chem. Soc. 2014, 136, 4369-4381; and J. Jiang, et al., *Superacidity in Sulfated Metal-Organic Framework-808*, J. Am. Chem. Soc. 2014, 136, 12844-12849, the contents of each of which are incorporated by reference in their entirety. Non-defected MOF-808 comprises at least six more potential aqua/hydroxyl terminal sites per Zr cluster as compared to the parent UiO-66 MOF (non-defected). It is believed that introduction of additional defects to MOF-808 may be done using synthetic methods described herein.

The organic linker is not narrowly limited and may suitably be any organic linker conventionally used in MOF production. Suitable organic linkers generally comprise at least two functional groups selected from carboxylic acid, boronic acid, amine, nitro, anhydride, hydroxyl, and combinations thereof. Organic linkers having two, three or four functional groups are within the scope of the present disclosure. In some aspects, the functional groups are selected from carboxylate and hydroxyl, and a combination thereof. In one aspect, each functional group is carboxyl.

The organic linker may comprise a linear or branched $C_{1-20}$ alkyl group, a $C_{3-12}$ cycloalkyl group, an aromatic moiety, and combinations thereof. In some aspects, the alkyl group is a $C_{1-6}$ alkyl. In some aspects, the cycloalkyl group is a $C_{4-6}$ cycloalkyl. In some aspects, the aromatic moiety can comprise from 1 to 6 rings. For aromatic moieties having more than one ring, the rings may optionally be present in a spirocycle or fused configuration. In some aspects, the aromatic moiety comprises one or two rings, such as benzyl, naphthyl, pyridyl or bipyridyl. The alkyl, cycloalkyl and aromatic moieties may optionally comprise one or more heteroatoms selected from N, O, S, and Si.

Examples of suitable organic linker compounds include: BTC; oxalic acid; ethyloxalic acid; fumaric acid; 1,3,5-benzene tribenzoic acid (BTB); 1,3,5-benzene tribenzoic acid; benzene tribiphenylcarboxylic acid (BBC); 5,15-bis(4-carboxyphenyl) zinc (II) porphyrin (BCPP); 1,4-benzene dicarboxylic acid ($H_2$BDC); 2-amino-1,4-benzene dicarboxylic acid (R3-BDC or H2N BDC); 1,2,4,5-benzene tetracarboxylic acid; 2-nitro-1,4-benzene dicarboxylic acid; 1,1'-azo-diphenyl 4,4'-dicarboxylic acid; cyclobutyl-1,4-benzene dicarboxylic acid (R6-BDC); 1,2,4-benzene tricarboxylic acid; 2,6-naphthalene dicarboxylic acid (NDC); 1,1'-biphenyl 4,4'-dicarboxylic acid (BPDC); 2,2'-bipyridyl-5,5'-dicarboxylic acid; adamantane tetracaboxylic acid (ATC); adamantane dibenzoic acid (ADB); adamantane teracarboxylic acid (ATC); dihydroxyterephthalic acid (DHBDC); biphenyltetracarboxylic acid (BPTC); tetrahydropyrene 2,7-dicarboxylic acid (HPDC); pyrene 2,7-dicarboxylic acid (PDC); pyrazine dicarboxylic acid; acetylene dicarboxylic acid (ADC); camphor dicarboxylic acid; fumaric acid; benzene tetracarboxylic acid; 1,4-bis(4-carboxyphenyl)butadiyne; nicotinic acid; and terphenyl dicarboxylic acid (TPDC). In some aspects, the organic linker compounds are selected from $H_2$BDC, 2-amino-1,4-benzene dicarboxylic acid, 1,2,4-benzene tricarboxylic acid, 1,2,4,5-benzene tetracarboxylic acid and 2-nitro-1,4-benzene dicarboxylic acid or mixtures thereof. In some particular aspects, the organic linker compound is $H_2$BDC.

In some aspects, a mixture of two or more of the above-mentioned linkers may be used to introduce one or more functional groups. For instance, aminobenzoic acid may be used to provide free amine groups or by using a shorter linker such as oxalic acid.

The electrolyte is not narrowly limited, and suitable electrolytes are known in the art. Solid and liquid electrolytes are within the scope of the present disclosure. See, for instance: J. Scheers, et al., *A review of electrolytes for lithium-sulfur batteries, Journal of Power Sources,* 2014, 255(1), 204-218; X. Yu, et al., *Electrode-Electrolyte Interfaces in Lithium-Sulfur Batteries with Liquid or Inorganic Solid Electrolytes*, Acc. Chem. Res., 2017, 50(11), 2653-2660; and X. Judez, et al., *Review-Solid Electrolytes for Safe and High Energy Density Lithium-Sulfur Batteries: Promises and Challenges*, Journal of The Electrochemical Society, 2018, 165(1), the contents of each of which are incorporated by reference in their entirety. In some non-limiting aspects, the electrolytes may suitably comprise ether mixtures, dimethylsulfoxide, and dimethylformamide. An example of one such electrolyte is Li bis(trifluoromethane sulfonimide) (LiTFSI) dissolved in a mixture of dimethoxyethane and dioxalane.

In any of the various aspects of the disclosure, and in a non-limiting example for the preparation of a defected MOF within the scope of the present disclosure, defected UiO-66 samples may be synthesized using the modulated synthesis approach developed by Lillerud et al,. using competing monocarboxylic acids that are then incorporated into the MOF structure (See G. Shearer, et al., *Functionalizing the Defects: Postsynthetic Ligand Exchange in the Metal Organic Framework UIO-66*, Chem. Mater. 2016, 28, 7190-7193 and G. C. Shearer, et al., *Defect Engineering: Tuning the Porosity and Composition of the Metal-Organic Framework UiO-66 via Modulated Synthesis*, Chem. Mater., 2016, 28, 3749-3761). The competing carboxylic acid can then be swapped with an aqua and hydroxyl ligand to create an open site on the UiO-66 $Zr_6$-cluster for further binding or functionalization. By varying the modulating strength (e.g. pKa, binding constants) and molar ratio of the modulator to the multi-topic carboxylic acid linker used in synthesis a series of MOFs with controllable defect concentrations may be obtained. An increase in missing linker sites correlates to an increased number of labile protons by introducing $H_2O$— and HO— groups that can be quantified by potentiometric acid-base titration. See M. R. R. Destefano, et al., *Room-Temperature Synthesis of UiO-66 and Thermal Modulation of Densities of Defect Sites*, Chem. Mater., 2017, 29, 1357-1361, the contents of which are incorporated by reference herein in its entirety. The methods provide the ability to swap the acidic protons of both the defect site and node structure with $Li^+$ to create stable Li-ion reservoirs within the material framework.

Figure 14:
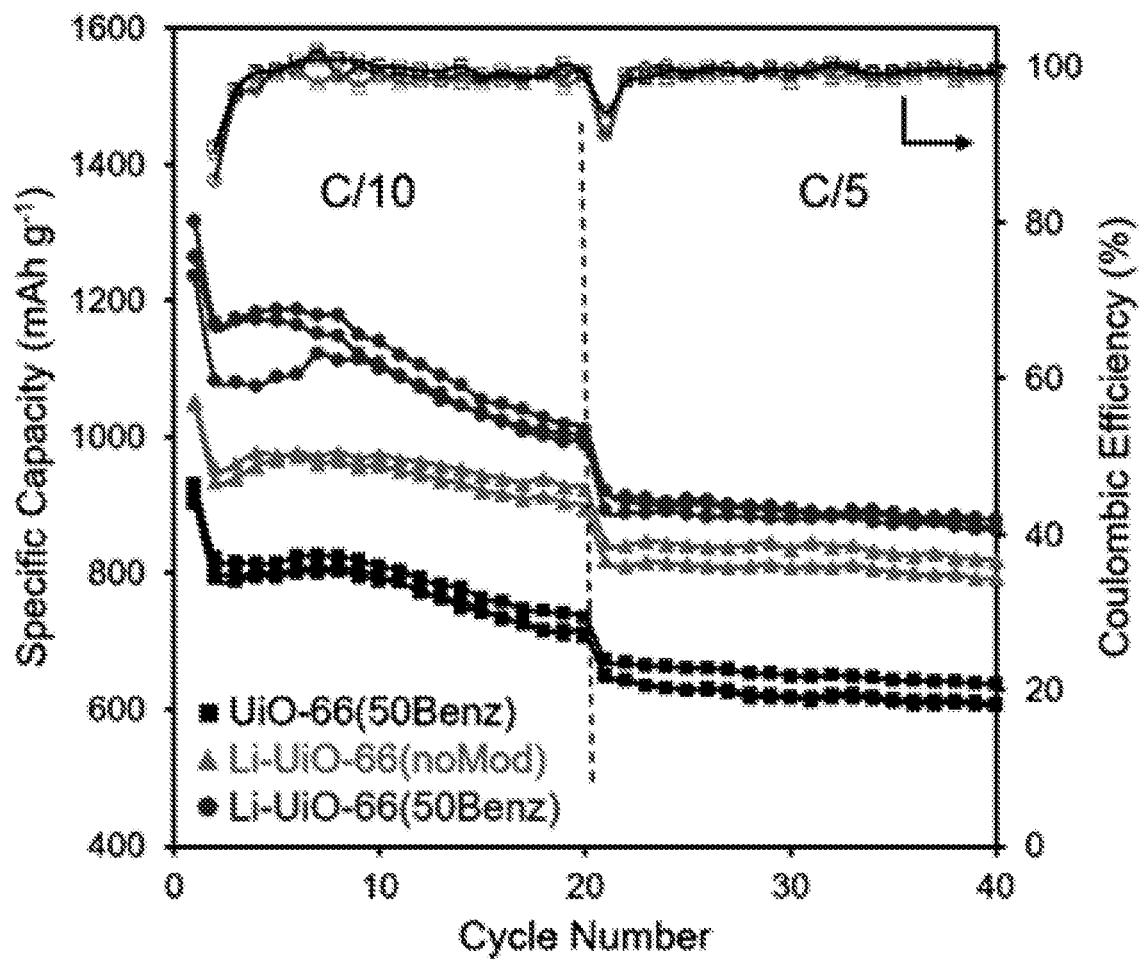
FIG. 14 on the left axis and the associated bottom three lines of closed shapes of the graph depicts the absolute capacity (mAh g$^{-1}$) versus battery cycle number for a lithium-sulfur battery of the present disclosure having a cathode comprising lithiated metal organic frameworks versus a lithium-sulfur battery having a cathode comprising a non-lithiated metal organic framework.

During the reduction of sulfur to polysulfide in a Li—S battery, the electron transfers must be accompanied by $Li^+$ diffusion for charge balance. It is believed, without being bound to any particular theory, that an increase in available sites for lithiation on the MOF framework will lead to faster $Li^+$ conduction and serve as a Li reservoir. It is further believed that a high concentration of already-present Li ions in the MOF structure would facilitate the formation and encapsulation of polysulfides through favorable electrostatic interactions. Based on experimental evidence to date, there is a substantial increase in Li concentration in lithiated defected UiO-66 as compared to parent UiO-66 (i.e., UiO-66 having minimal defects). Further based on experimental evidence to date and in one non-limiting example, lithiated defected UiO-66, exemplified by Li-UiO-66(50Benz) in FIG. 14, provided for enhanced Li—S capacity retention as compared to parent UiO-66. Yet further based on the experimental evidence, lithiated defected UiO-66 provided for a maximum Li—S battery capacity of about 900 mAh $g^{-1}$ (about 1390 Wh $kg^{-1}$) and it is believed that the use of MOFs with lithiated defect sites used as a host for polysulfides improves Li—S cyclability and provides for a specific energy density closer to the theoretical limit.

In accordance with the present disclosure, the degree of lithium incorporation can be controlled by, for instance, (i) the concentration of defect sites, (ii) the strength of the base (pKa<30), and (iii) the temperature used for synthesis (-77 to 200° C.). According to acid-base titrations carried out in aqueous media, the $pK_a$ values of the UiO-66 $\mu_3$-OH, —$OH_2$, and —OH are 3.52, 6.79, and 8.30, respectively. See R. C. Klet, et al., *Evaluation of Brønsted acidity and proton topology in Zr-and Hf-based metal-organic frameworks using potentiometric acid-base titration*, J. Mater. Chem. A, 2016, 4, 1479-1485, the contents of which are incorporated herein in its entirety. However, is has been found that the stability of UiO-66 in aqueous media may be affected when the pH deviates from neutral; both acidic and basic conditions may result in MOF degradation as evidenced by PXRD and ATR-IR experiments. See Y. Huang, et al., *Stability and degradation mechanisms of metal-organic frameworks containing the $Zr_6O_4(OH)_4$ secondary building unit*, J. Mater. Chem. A, 2013, 1, 5642-5650, the contents of which are incorporated herein in its entirety. To inhibit or avoid MOF decomposition, lithiation procedures may be carried out using a polar aprotic solvent in strongly basic solutions. In some aspects, the strong base is an organolithium base such as N-butyllithium. In some aspects, the base is an amine, a hydroxide, or an alkoxide such as pyridine, trimethylamine (TEA), or sodium methoxide. In some such aspects, the polar solvent may be selected from N-methylpyrrolidone, tetrahydrofuran, ethyl acetate, acetone, methanol, ethanol, dimethylformamide (DMF) acetonitrile, dimethyl sulfoxide and propylene carbonate. In one aspect, the solvent is DMF. In some aspects, the lithium source may come from an organolithium base or a lithium salt such as, but not limited to, $LiNO_3$. The lithiation procedure may suitably have a reaction time of at least one hour, at least 4 hours, at least 8 hours, at least 16 hours or at least 24 hours, such as for instance 24 hours.

As previously disclosed, defect site concentration plays a role in lithium storage capability. An increased number of defect sites results in more acidic protons. Highly defected MOFs will undergo $H^+/Li^+$ exchange readily and have a greater lithium content. Based on experimental evidence to date for the non-limiting examples of Li-UiO-66, Li-UiO-66(12TFA), and Li-UiO-66(50Benz), the lithium content of Li-UiO-66, Li-UiO-66(12TFA), and Li-UiO-66(50Benz) increases as a function of defect concentration, such as quantified by Li and Zr atomic absorption spectroscopy (AAS). Further lithiation can also be achieved by elevating the temperature or increasing the strength of the base. For example, heating UiO-66(50Benz) in a solution containing $LiNO_3$ and TEA in DMF described above to 60 and 80° C. leads to an increase in molar Li concentration by 1.3× and 1.7×, respectively. The use of the stronger base, n-butyllithium, at room temperature also enhanced the molar Li content by 1.8× compared to the analogous room-temperature lithiation using TEA.

Based on experimental evidence to date, and without being bound to any particular theory, under one theory it is believed that that the Li reservoirs in the MOFs will promote encapsulation of polysulfides through favorable electrostatic interactions.

Figure 2:
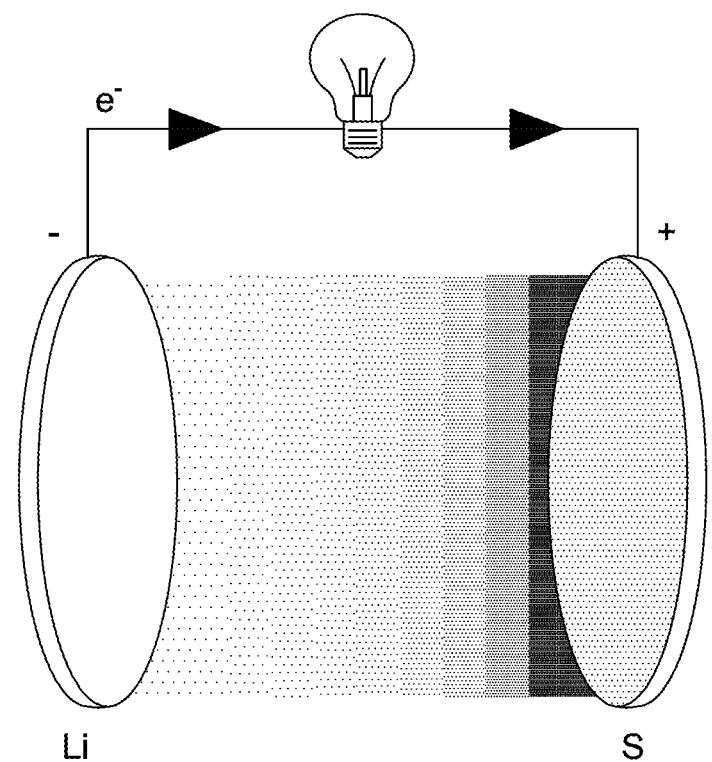
FIG. 2 depicts one embodiment of a lithium-sulfur battery of the present disclosure.
Figure 2:

Further based on experimental evidence to date, and without being bound to any particular theory, based on the success of using Li-rich cathodes, it is believed that the amount of lithium in the cathode may favorably influence polysulfide encapsulation and Li—S battery performance. The reduction of neutral sulfur ($S_8$) to shorter chain lithium polysulfides requires the diffusion of charge-balancing $Li^+$ ions to reach high sulfur utilization in a Li—S battery (see FIG. 2). Increasing the Li content would not only further promote Li ion conduction, but also provide favorable electrostatic interactions to stabilize the charged polysulfides and prevent their dissolution. However, Li content is not easily tunable in conventional solid-state materials as it may ultimately impact the lattice energy and lead to other structural changes.

In some aspects of the present disclosure, lithium-defected MOFs are provided that promote metal conduction and electrostatic interactions with polysulfides. In some particular aspects, Li—S cathodes comprise such lithium-defected MOFs. In some such aspects, the defected MOFs are Zr-MOFs. Lithiated-MOFs provide for high-capacity sulfur cathodes and extended Li—S cycling. A scheme for lithiating defected Zr-MOFs is depicted in FIG. 1.

Figure 3:
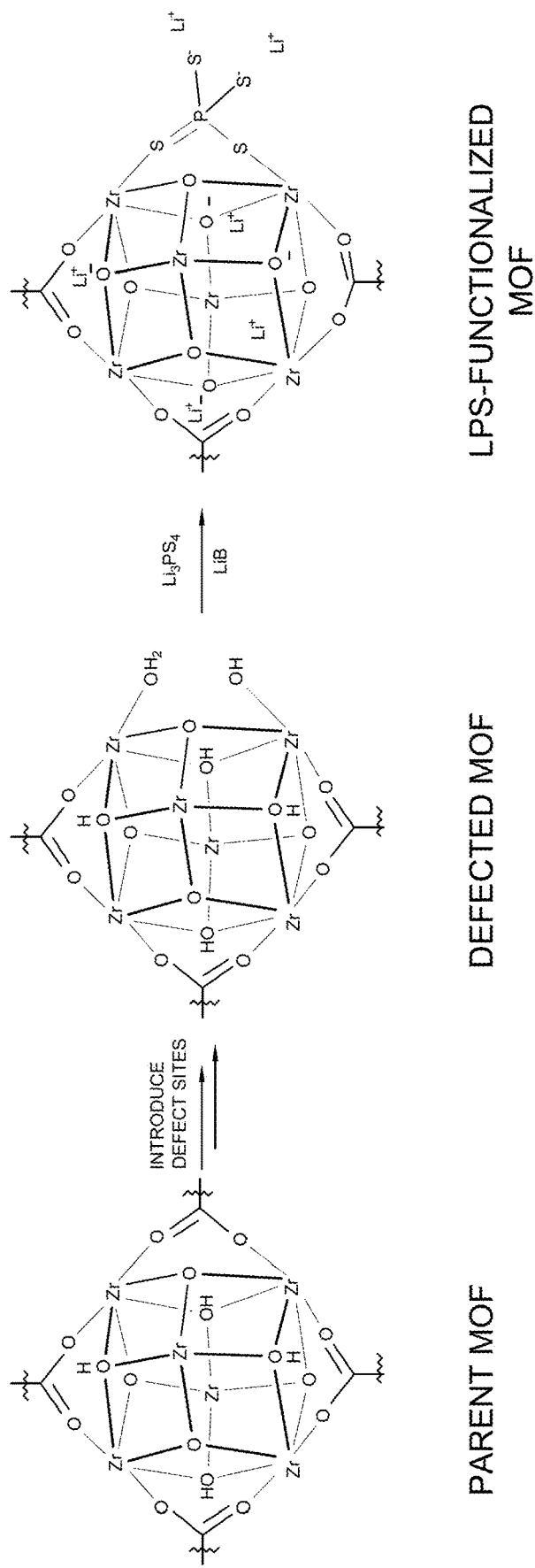
FIG. 3 depicts one aspect of the present disclosure for functionalizing defective sites with a chemical anchor, such as $Li_3PS_4$, on UiO-66 metal organic framework clusters and lithiating the defected metal organic framework cluster.
Figure 4A:
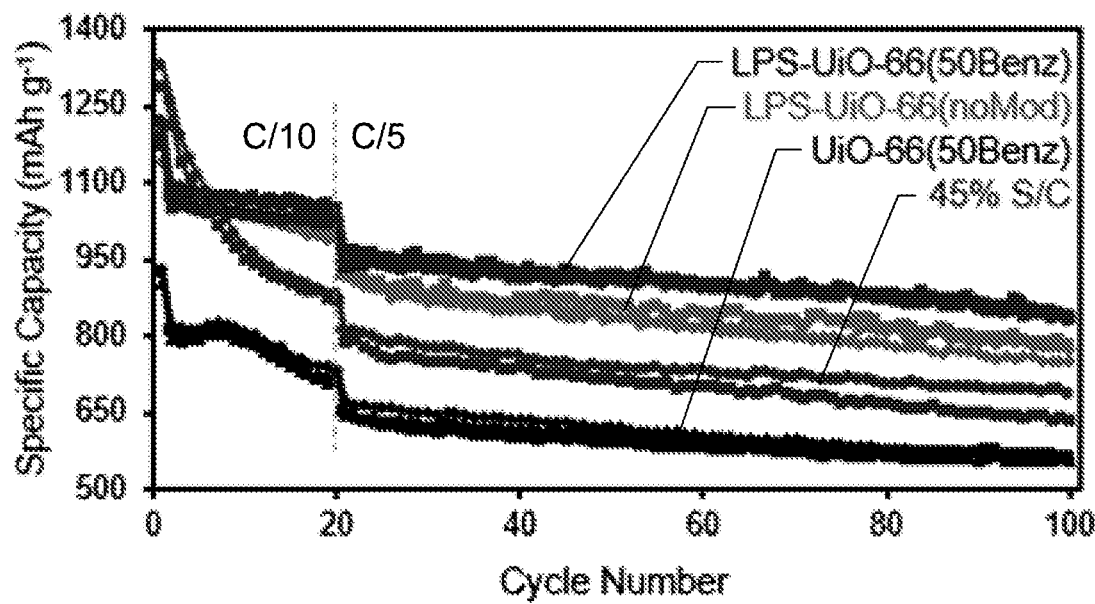
FIG. 4A depicts the galvanostatic cycling results in specific capacity (mAh $g^{-1}$) versus cycle number for lithium-sulfur batteries of the present disclosure having a cathode comprising lithiated metal organic frameworks (LPS-UiO- 66(50Benz) and LPS-Uio66(noMod)) versus a battery having a cathode comprising a non-lithiated metal organic framework (UiO-66(50Benz) and a battery comprising a sulfur-carbon composite cathode (S/C).
Figure 4B:
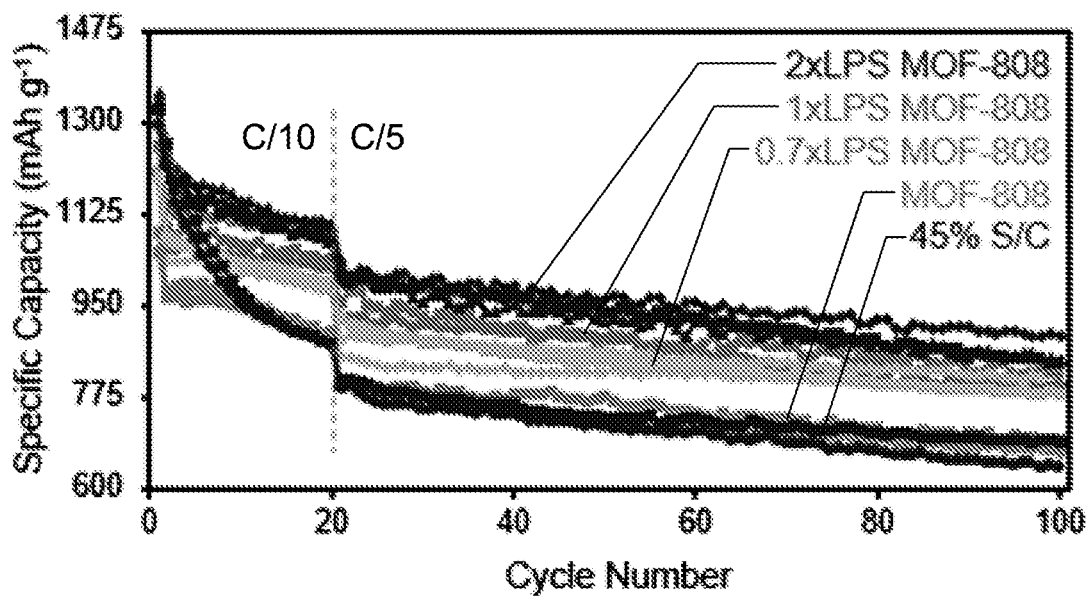
FIG. 4B depicts the galvanostatic cycling results in specific capacity (mAh g$^{-1}$) versus cycle number for lithium-sulfur batteries of the present disclosure having cathodes comprising lithiated metal organic frameworks (2×LPS MOF-808; 1×LPS MOF-808; and 0.7×LPS MOF-808;) versus a battery having a cathode comprising a non-lithiated metal organic framework (MOF-808) and a battery comprising a S/C composite cathode.

In some aspects of the present disclosure, lithium-defected MOFs are provided that incorporate chemical anchor functional groups for covalent anchoring of polysulfides. In some particular aspects, Li—S cathodes comprise such lithium-defected MOFs. Examples of suitable chemical anchors for polysulfides include: thiophosphates, such as $[P_xO_yS_z]^{a-}$ where x is 1-3, y is 0-9, z is 1-10, and a is 3-6; thiogermanates, such as $[Ge_xO_yS_z]^{a-}$ where x is 1-3, y is 0-9, z is 1-10, and a is 3-6; and thioarsenates, such as $[As_xO_yS_z]^{a-}$ where x is 1-3, y is 0-9, z is 1-10, and a is 3-6. Based on experimental evidence to date, defected Zr-MOF was functionalized with the chemical anchor $Li_3PS_4$ (LPS). FIG. 3 depicts introducing —OH and —$H_2O$ protic defect sites to linked Zr-UiO-66 MOF clusters, deprotonizing the active sites, and lithiating the deprotonated defective MOF active sites thereby generating Li-UiO-66(MOD) (where UiO-66 (MOD) refers to defected UiO-66 synthesized with modulators (MOD), such as benzoic acid and TFA). Under one theory, and without being bound to any particular theory, it is believed that covalent S—S bonds are reversibly formed on the $PS_4^{3-}$ unit during battery cycling to form $P(S_2)_4^{3-}$. Further based on experimental evidence, as depicted in FIGS. 4A and 4B, use of LPS functionalized Zr-MOF in a Li—S battery (LPS-UiO-66(MOD)) provides for enhanced capacity retention as compared to unfunctionalized defect-free Zr-MOFs providing for a very high capacity of about 1200 mAh $H^{-1}$ (about 1860 Wh $kg^{-1}$).

Figure 19:
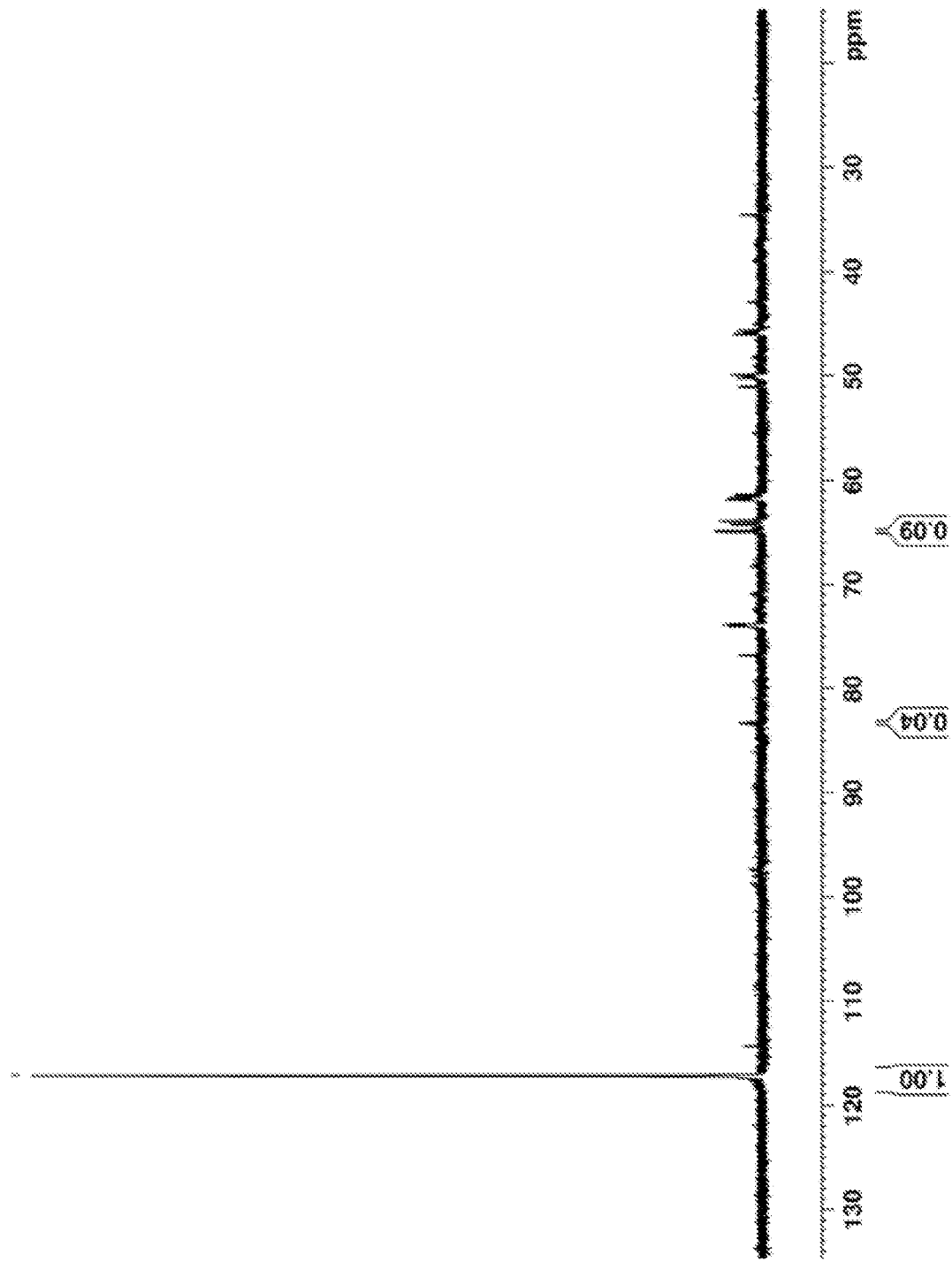
FIG. 19 depicts the NMR spectrum of Li$_5$P$_2$S$_6$N material of the present disclosure.
Figure 20:
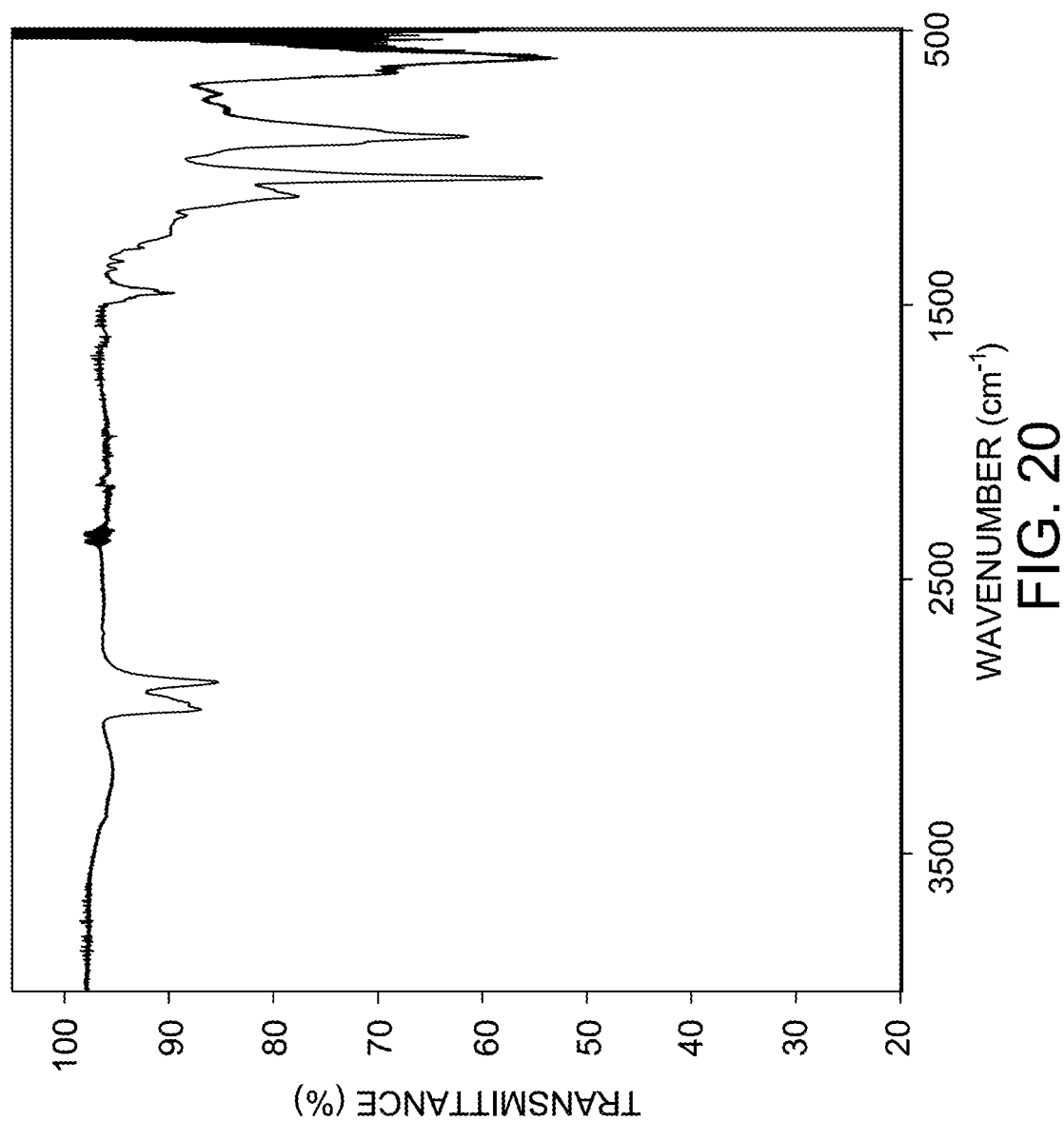
FIG. 20 depicts the IR spectrum of Li$_5$P$_2$S$_6$N material of the present disclosure.

In some other aspects of the present disclosure, chemical anchor functional groups for covalent anchoring of polysulfides are thiophosphates of the general formula $M_rP_nS_o$ and $M_rP_nS_oX_q$. In any of the various such aspects, M is Li or Na. X is a non-sulfur atom such a N, O or a halide. r is 2 to 9, n is 1 to 3, o is 1 to 8, and q is 1 to 4. Examples of such suitable anchors include $Li_5P_2S_6N$, $Li_3PS_3O$, and $Li_2PS_3Cl$. Such lithiated thiophosphate chemical anchors are referred to as LPSN, LPSO, or LPSX. Example NMR and IR spectra of LPSN materials are shown in FIGS. 19 and 20. In some other aspects of the present disclosure, Li—S cathodes comprise both lithium-defected MOFs that promote metal conduction and electrostatic interactions with polysulfides as described herein and lithium-defected MOFs that incorporate chemical anchor functional groups for covalent anchoring of polysulfides as described herein.

The present disclosure demonstrates that lithiation of Zr-based MOFs enhances performance of Li—S batteries. The demonstrated high capacity of 1272 mAh $g^{-1}$ exceeds the best Sulfur/Carbon electrodes known in the art and approaches the theoretical limit of 1680 mAh $g^{-1}$ of Li—S batteries. Li—S battery performance may be demonstrated by galvanostatic cycling studies. One metric of battery performance in Li—S batteries is maximum charge capacity that is a reflection of the ability of the battery to store charge and is directly related to the total energy density. For the non-limiting example of the defected MOF Li-UiO-66 (MOD), where MOD represents the modulator used in the modulated synthesis, it is believed that the additional Li sites promote the reduction of polysulfides and enhance the maximum charge capacity. The cycle life metric is measured by the relative capacity after extended galvanostatic cycling.

The rate of capacity decay provides insights on the ability of the MOFs to retain polysulfides during the discharge cycles.

EXAMPLES

Example 1: Synthesis of UiO-66(MOD)

Following a modified procedure, UiO-66-MOD MOFs were synthesized with varying modulators (MOD) to incorporate defects. See G. Shearer, et al., Chem. Mater. 2016, 28, 7190-7193 and G. C. Shearer, et al., Chem. Mater., 2016, 28, 3749-3761. In a typical synthesis, 1.70 g of $ZrCl_4$ (7.3 mmol) and 1.23 g $H_2BDC$ (7.4 mmol) were added to a 500 mL Erlenmeyer flask containing 200 mL DMF. A controlled amount of the modulators trifluoroacetic acid (TFA) and benzoic acid (benz) was added for the formation of UiO-66 (12TFA), UiO-66(36TFA), and UiO-66(50Benz), and their defect concentration was analyzed by Atomic Absorption Spectroscopy with the results reported in Table 1 below. For each, the mixture was stirred at 50° C. for 5 minutes until all reagents dissolved. Once dissolved, 0.40 mL of $H_2O$ was added and the flask was covered and placed into a pre-heated oven set to 80° C. for 1 h. The oven temperature was then increased to 120° C. and left for 72 h. The obtained solids were collected by centrifuge and washed in 150 mL of fresh DMF overnight. The solids were again collected and washed with DMF in this manner 2× more times for 4 h. After washing, the MOF powders were dried overnight at 60° C.

TABLE 1

Relative Defect concentration of UiO-66(12TFA), UiO-66(36TFA), and UiO-66(50Benz) and their associated number of missing linkers.

|  | Molar Ratio of MOD:$ZrCl_4$ | Number of Missing Linkers |
| --- | --- | --- |
| UiO-66 | 0 | 0 |
| UiO-66(12TFA) | 12 | 1.2 |
| UiO-66(36TFA) | 36 | 2 |
| UiO-66(50Benz) | 50 | 3 |

To exchange the incorporated modulator, a process termed "HCl activation" was used in accordance with previous modulated synthesis of UiO-66. See G. Shearer, et al., Chem. Mater. 2016, 28, 7190-7193. A DMF-HCl solution was prepared using a ratio of 600:25 of DMF to 8M HCl (v/v). For every 2 g of UiO-66-MOD obtained, 600 mL of this solution was used for the HCl activation process. The HCl activation process may be scaled up or down accordingly. 1 g of the as-synthesized and dried MOF powders were added to 500 mL Erlenmeyer flasks along with 312.5 mL of the DMF-HCl solution, covered, and placed into a pre-heated 100° C. oven and held for 48 h. The solids were collected via centrifuge and wash in the manner described above using 150 mL DMF for 3× washes over 2 days. After the last wash, the excess DMF was removed and the MOF powder was dried in a 60° C. oven overnight. Each modulated syntheses resulted in different yields ranging from 1.5-2.5 g after HCl activation.

For comparison, Li-UiO-66(noMod) was also synthesized and activated using the same procedure except no modulators were added in the initial UiO-66 synthesis.

Example 2: Synthesis of Li-UiO-66(MOD)

A lithium incorporation solution was prepared by dissolving 82 mg $LiNO_3$ (70 mmol) in 10.5 mL DMF. Once dissolved, 6.3 mL of triethylamine (TEA, 45 mmol) was added to the solution as the base for deprotonation. This solution was then added to a 20 mL scintillation vial containing about 150 mg HCl-Activated UiO-66(MOD) followed by shaking to mix. The mixture was allowed to react (e.g. at room temperature or in an oven set to 60 or 80° C. for 24 h). After 24 hours the solution was decanted and replaced with 20 mL of acetone. The solids were collected by centrifuge, washed with 20 mL acetone, and allowed to soak in a new acetone solution overnight. The solids were washed four more times with acetone, and after one of the additional washes the solids were soaked overnight in acetone. Following the acetone washes, the solvent was switched to DCM and the above wash process was repeated. After the last DCM wash, the solvent was removed and the Li-UiO-66(MOD) solid was allowed to dry in air. Samples were stored in a desiccator until further use or characterization.

In an additional synthesis, n-butyl lithium was used as the base instead of TEA. As-synthesized UiO-66(50Benz) was solvent-exchanged from DMF to acetone and then to DCM using the washing procedure described above. 150 mg of MOF was then placed into a 25 mL round bottom flask fitted with a Schlenk adapter and purged under flowing nitrogen. To this flask, 7 mL of a 1.6 M n-butyl lithium solution in hexane was slowly added to the flask under flowing nitrogen and held for 24 h. The solution was removed and the collected MOF was washed several times with 10 mL pentane followed by soaking and solvent exchange using distilled tetrahydrofuran.

Figure 9:
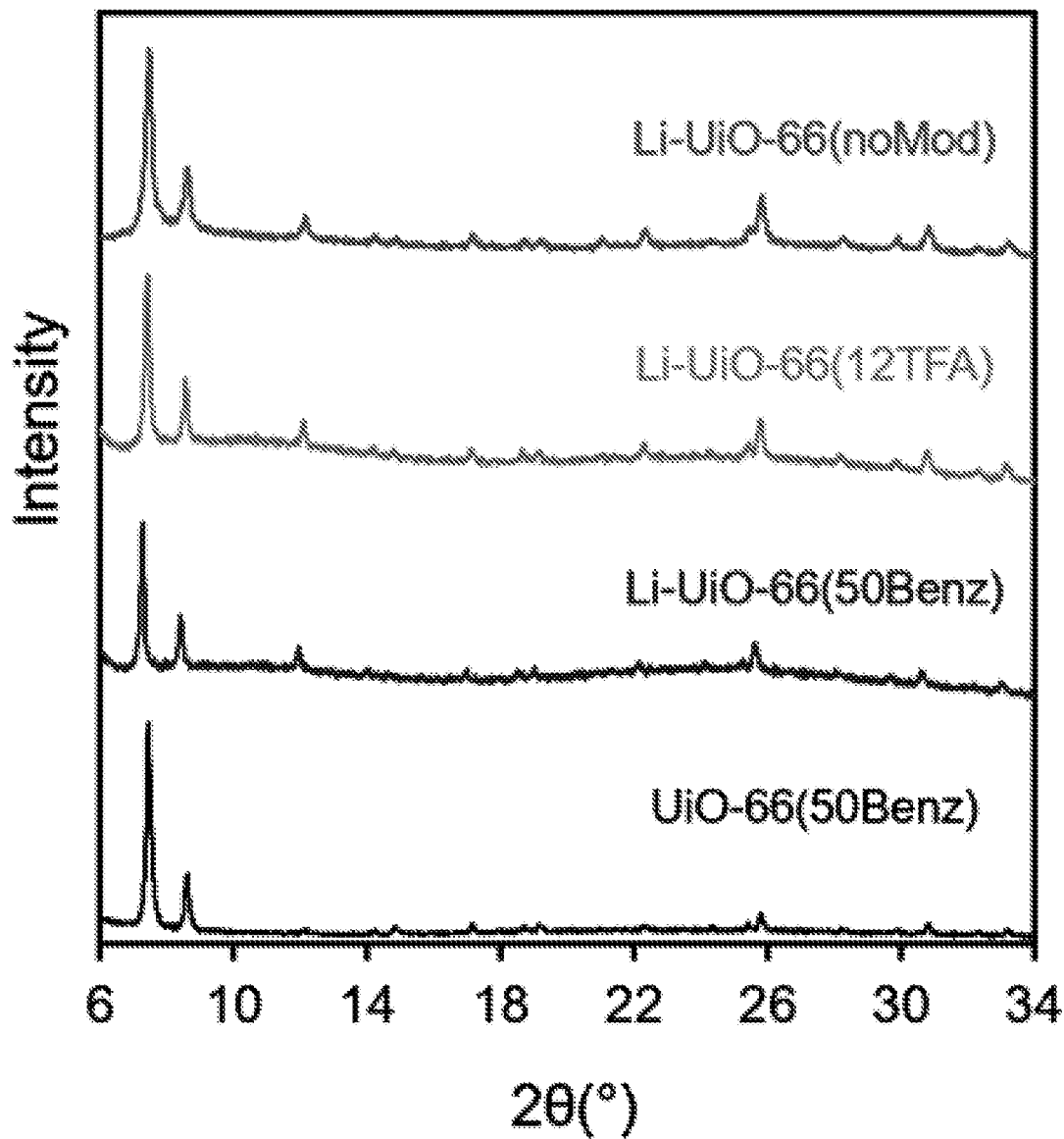
FIG. 9 depicts Powder X-ray diffraction (PXRD) results in counts versus position in 2° Theta for lithiated defected metal organic frameworks of the present disclosure (Li-UiO-66(noMod), Li-UiO-66(50Benz) and Li-UiO-66(12TFA)) and for a non-lithiated metal organic framework (UiO-66 (50Benz)).
Figure 10:
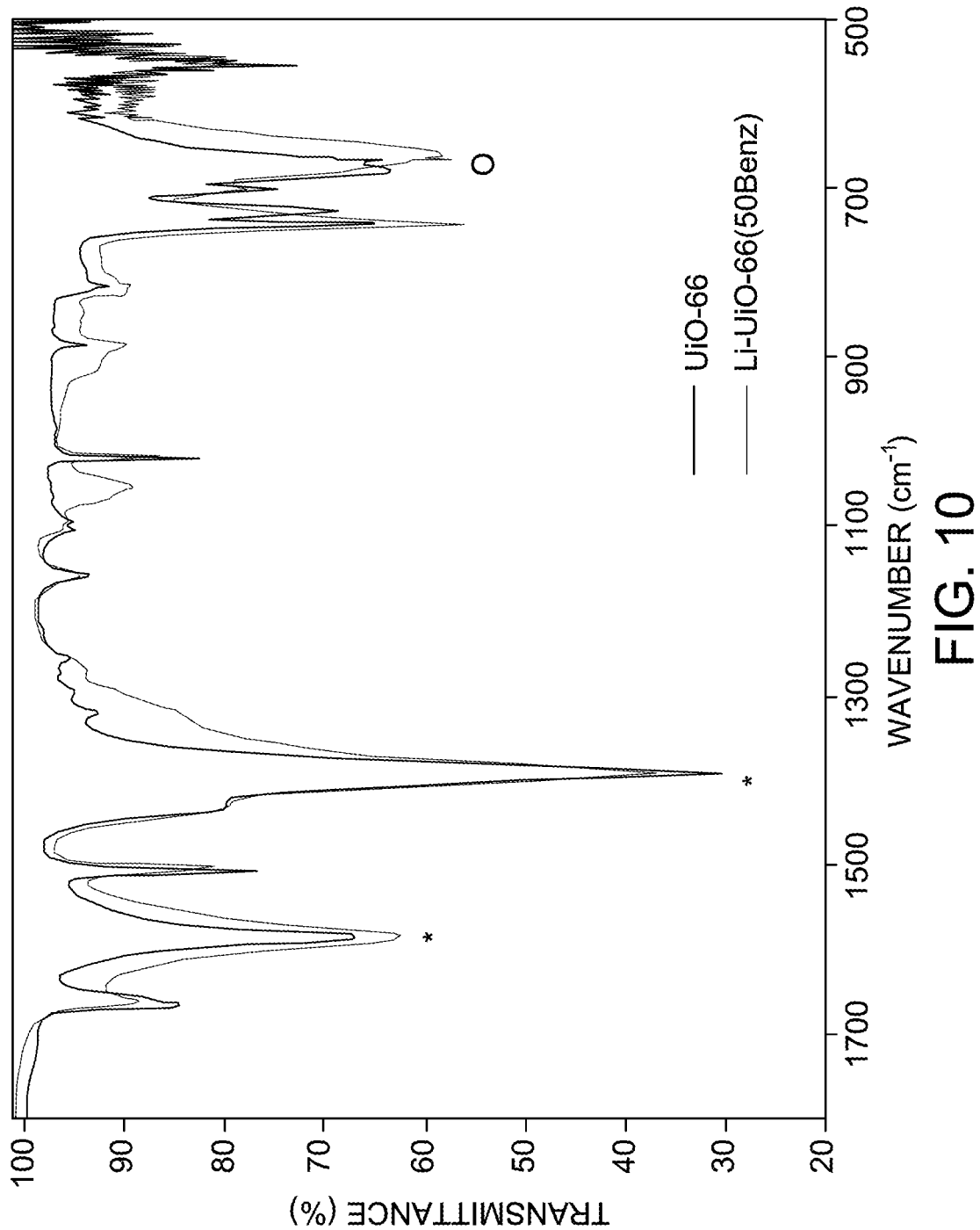
FIG. 10 depicts infrared (IR) spectroscopy results in transmittance (%) versus wavenumber (cm') for a lithiated defected metal organic framework of the present disclosure (Li-UiO-66(50Benz)) and for a non-lithiated metal organic framework (UiO-66).

Li-UiO-66(50Benz) and non-lithiated UiO-66(50Benz) polycrystalline powders at ambient temperature were evaluated by powder X-ray diffraction (PXRD, Bruker D8 Focus diffractometer, Cu Kα, LynxEye detector) and infrared spectroscopy (IR, ThermoScientific Nicolet iS FT-IR with iD 5 ATR attachment) with the results shown in FIGS. 9 and 10. FIGS. 9 and 10 both show the lithiated MOFs remain structurally intact with high crystallinity. FIG. 9 shows that, for TEA-treated MOFs and based on PXRD, the lithiated MOF structure remains intact with crystallinity as compared to HCl-activated UiO-66(50Benz). The asterisks in FIG. 10 (IR spectroscopy) shows that UiO-Li has characteristic MOF carbonyl stretches thereby indicating that the structure is preserved. A slight shift in the Zr—O peak (denoted by o) indicates that supporting node deprotonation occurs. Li-UiO-66(50Benz) and non-lithiated UiO-66(50Benz) were further evaluated by scanning electron microscopy (JEOL JSM IT100) and showed no deterioration of the octahedral crystals or a change in particle size between Li-UiO-66(50Benz) and UiO-66(50Benz).

Figure 11A:
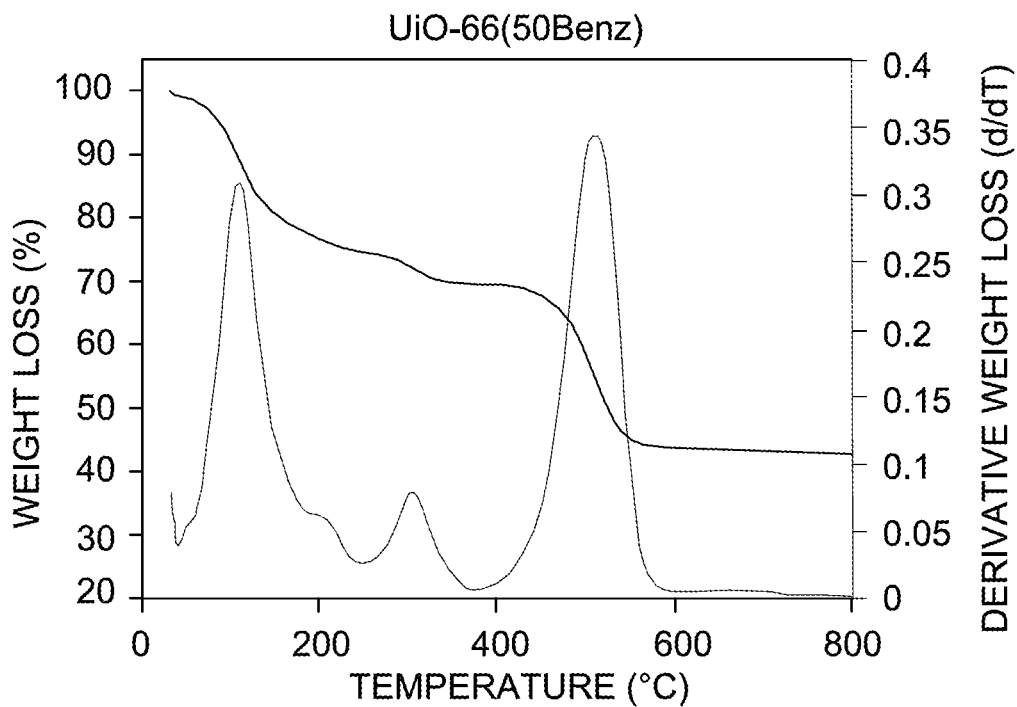
FIG. 11A depicts thermographic analysis (TGA) results in Weight Loss (%) versus Temperature (T) for a non-lithiated metal organic framework (UiO-66(50Benz)) and FIG. 11B depicts TGA results in Weight Loss (%) versus Temperature (T) for a lithiated metal organic framework of the present disclosure (Li-UiO-66(50Benz)).
Figure 11B:
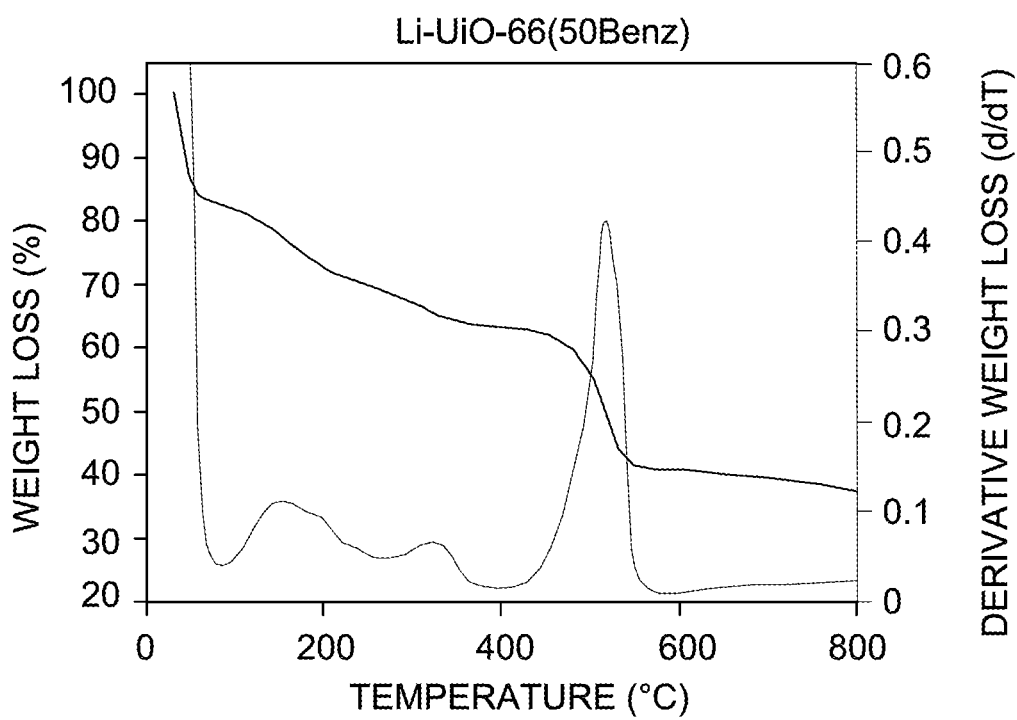

Li-UiO-66(50Benz) and UiO-66(50Benz) were further evaluated by thermographic analysis (TGA, TA Instruments SDT Q600 under flowing Ar at a heating rate of 5.0° C. $min^{-1}$). The TGA plots depicted in FIGS. 11A and 11B show the characteristic thermal stability of the Li-MOF remains unchanged as compared to MOF.

Li-UiO-66(50Benz) and UiO-66(50Benz) were further evaluated by nitrogen adsorption techniques (Micromeritics ASAP2020Plus). Li-UiO-66(50Benz) provided a BET surface area of 450.6 $m^2/g$ and UiO-66(50Benz) provided a BET surface area of 1520.8 $m^2\ g^{-1}$. The BET data show increasing surface area as a function of defect concentration.

The experimental data therefore show that the lithiation method does not degrade the UiO-66 structure, and the advantageous properties of high crystallinity, thermal stability, and high surface area are preserved.

Example 3: Evaluation of MOF Defective Site Concentration

Figure 12:
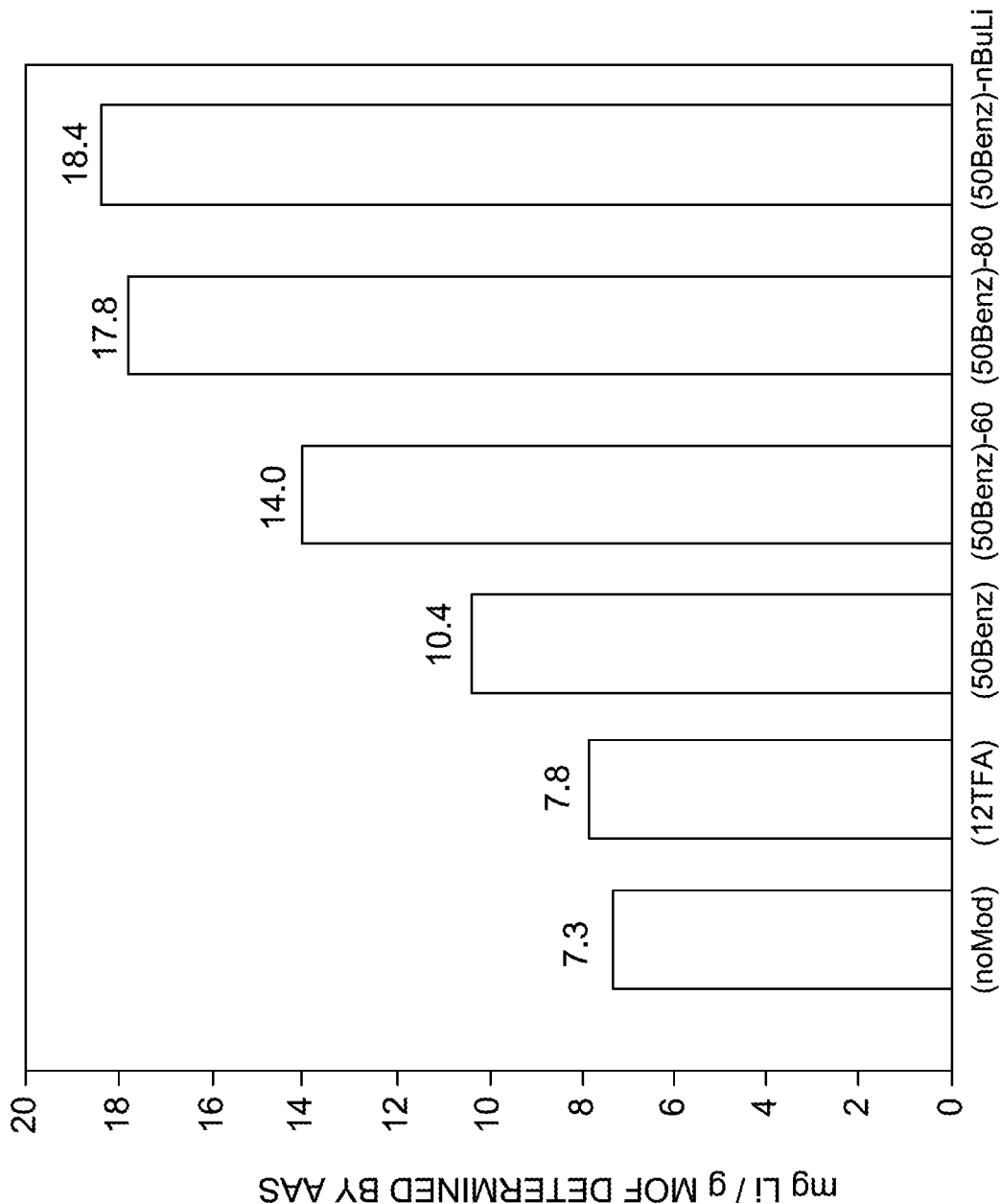
FIG. 12 depicts atomic absorption spectroscopy (AAS) results of lithium incorporated into lithiated metal organic frameworks of the present disclosure (Li-UiO-66(MOD)) prepared under various lithiation synthetic conditions.

The defect site concentration plays a role in lithium storage capability. Since an increased number of defect sites results in more acidic protons, the most defected samples will undergo $H^+/Li^+$ exchange readily and have a higher lithium content. Based on experimental evidence, it has been shown that the lithium content in Li-UiO-66(noMod), Li-UiO-66(12TFA), and Li-UiO-66(50Benz) increases as a function of defect concentration as quantified by Li and Zr atomic absorption spectroscopy (AAS, Perkin Elmer AAnalyst 100 system and Perkin Elmer Intesitron hollow cathode lamps). As depicted in FIG. 12, an increased quantity of defect sites results in a greater number of acidic protons, and the most defected UiO-66(50Benz) had the most lithium incorporation, which also translates to the highest Li atom per SBU as shown in Table 2 below. When no base or a weaker base (pyridine) is used in the lithiation procedure, the amount of lithium in the MOF is reduced as shown in Table 3 below. Further based on experimental evidence, it has been found that improved lithiation can be achieved by elevating the temperature or increasing the strength of the base. For example, heating UiO-66(50Benz) in a solution containing $LiNO_3$ and TEA in DMF described above to 60° C. (Li-UiO66(50Benz)-60 and 80° C. (Li-UiO66(50Benz)-80) leads to an increase in molar Li concentration by 1.3 and 1.7x, respectively (see FIG. 12 and Table 2). The use of the stronger base, n-butyllithium (Li-UiO-66(50Benz)-nBuLi), at room temperature also enhanced the molar Li content by 1.8x compared to the analogous room-temperature lithiation using TEA. In all cases, the highly lithiated MOFs achieved via these alternate routes maintain their structural integrity and crystallinity (See FIGS. 9, 10, 11A and 11B).

TABLE 2

| Li-UiO Sample | Calculated Li atoms per $Zr_6$—SBU |
| --- | --- |
| Li-UiO-66(noMod) | 1.64 |
| Li-UiO-66(12TFA) | 1.72 |
| Li-UiO-66(50Benz) | 2.25 |
| Li-UiO-66(50Benz)-60 | 3.03 |
| Li-UiO-66(50Benz)-80 | 2.85 |
| Li-UiO-66(50Benz)-nBuLi | 3.98 |

TABLE 3

| Li-UiO Sample | Mg Li/g MOF determined by AAS |
| --- | --- |
| Li-UiO-66(noMod) | 7.3 |
| Li-UiO-66(12TFA) | 7.8 |
| Li-UiO-66(50Benz) | 10.4 |
| Li-UiO-66(50Benz)-no base | 0.6 |
| Li-UiO-66(50Benz)-acid | 0.0 |
| Li-UiO-66(50Benz)-pyridine | 1.1 |

UiO-66(noMod). UiO-66(50Benz) and MOF-808 were further evaluated for number of open sites and surface area. The number of open sites was determined by potentiometric acid-base titration according to the following method. First, the activated MOF powders were washed with acetone (5×20 mL over 24 h) and evacuated at 150° C. for 2 h to remove protic solvents from within the MOF. The evacuated flask was then charged with nitrogen and approximately 40 mg of powder was placed into a beaker. To this, a volume of 0.01 M $LiNO_3$ solution (50 mL solution for 50 mg MOF) was added to the beaker, covered, and left sitting for a minimum of 16 h prior to titration. Potentiometric titration was performed using a Vernier LabQuest2 with pH Probe and Drop Counter accessories. To start the titration, the pH of the solution was adjusted by adding 0.1 M HCl dropwise until a pH of 3.00 was reached. A burette was used to deliver a 0.05 M NaOH solution at a rate of approximately 0.02 mL min$^{-1}$ until the pH was 11. The derivative curve (dpH/dV, where V is the volume of 0.05 M NaOH solution) was used to determine the equivalence points (EP) to quantify the number of missing linkers for UiO-66 and MOF-808 samples, following previously reported procedures. The surface area was determined by The BrunauerEmmett Teller (BET) method was applied to obtain a surface area from the $N_2$ adsorption isotherms. Nitrogen adsorption isotherms (Micromeritics ASAP 2020) used to calculate BET surface areas were collected on samples that had been thoroughly degassed by heat and vacuum at 60° C. for 1 h, followed by holding at 150° C. for 2 h. The results are reported in Table 4 below. It has been discovered that the number of open sites may be used to systematically regulate the incorporation of guest molecules at the Zr-node.

TABLE 4

| Sample | BET Surface Area (m$^2$ g$^{-1}$) | Number of Open Sites |
| --- | --- | --- |
| UiO-66(noMod) | 1006 | 2.32 |
| UiO-66(50Benz) | 1530 | 3.64 |
| MOF-808 | 1099 | 4.06 |

Example 4: Cathode and Coin Cell Preparation

A cathode slurry was prepared using a 30 wt. % MOF, 45 wt. % S, 15 wt. % Super-P carbon (99+%, Alfa Aesar), and 10 wt. % poly(vinylidene fluoride) (PVDF) solid mixture in N-methyl-2-pyrrolidinone (NMP). The MOF was ground with a mortar and pestle and mixed with sulfur. The MOF and sulfur mixture were admixed with PVDF and Super-P carbon. A small stainless steel ball was added to the admixture and the solids were thoroughly mixed using a vortexer for 5 minutes. A slurry was prepared by adding NMP to the admixture and homogenizing on the vortexer for at least 30 min. The amount of NMP was measured by weight and in some aspects may be 4× the total mass of the solid mixture. After initial mixing, more NMP was added as needed in order to achieve desired slurry consistency for forming a homogeneous film after drying. Once homogenized, the slurry was cast onto pre-weighed 12.7 mm carbon paper discs and dried overnight in an 80° C. oven to form the cathodes. The 12.7 mm cathodes were weighed again to determine the sulfur loading and stored in an Ar-filled glovebox until use.

Figure 8:
FIG. 8 depicts an example of a coin cell battery. In some aspects, the coin cell battery has a cathode comprising a defected metal organic framework of the present disclosure.
Figure 8:
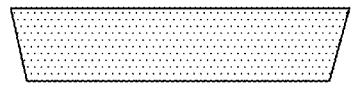
Figure 8:
Figure 8:
Figure 8:
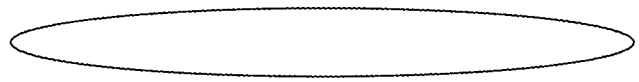
Figure 8:
Figure 8:
Figure 8:

CR 2032-type coin cells were constructed in an Ar-filled glovebox using a pre-weighed cathode, a polished metallic Li anode, two Celgard separators, two stainless steel spacers and spring (TOB New Energy). An example of a coin cell is shown in FIG. 8. The electrolyte was composed of 1 M bis-(trifluoromethanesulfonyl)imide lithium (LiTFSI) in a mixed solution of 1,2-dimethoxyethane (DME, 99+%) and 1,3-dioxolane (DOL, 99.5%) (1:1, v/v) with an added 2 wt. % lithium nitrate salt ($LiNO_3$, 99%). The amount of electrolyte added to each coin cell assembly was based on the mass of S on the cathode with a ratio of 60 µl, per mg S.

Example 5: Performance of Li—S Batteries Having a Cathode Comprising Lithiated Defected MOFs To evaluate maximum charge capacity and cycle life of Li—S batteries having a cathode comprising lithiated defected MOFs, cathodes containing a composite of Li-UiO-66(MOD) and Sulfur/Carbon were constructed to examine the effect of varying lithium content on Li—S performance.

In the evaluation of this example, cyclic voltammetry (CV) was performed on an Ivium-n-STAT Multichannel Electrochemical Analyzer. Freshly prepared coin cells were used for CV where the potential was cycled at a scan rate of 0.1 mV/s between 2.9 and 1.6 V vs. Li/Li$^+$. Coin cells were cycled galvanostatically (MNT-BA-SV, MicroNanoTools) after resting for 8 h. All cells were charged and discharged cyclically at a C-rate (where 1 C=fully charged or discharged in 1 hour) of C/10 (168 mA g$^{-1}$ S) for twenty cycles, followed by eighty cycles at C/5 (336 mA g$^{-1}$ S) unless otherwise stated. To obtain sufficient statistical significance, at least three of the same batteries were tested under the same conditions.

Figure 13:
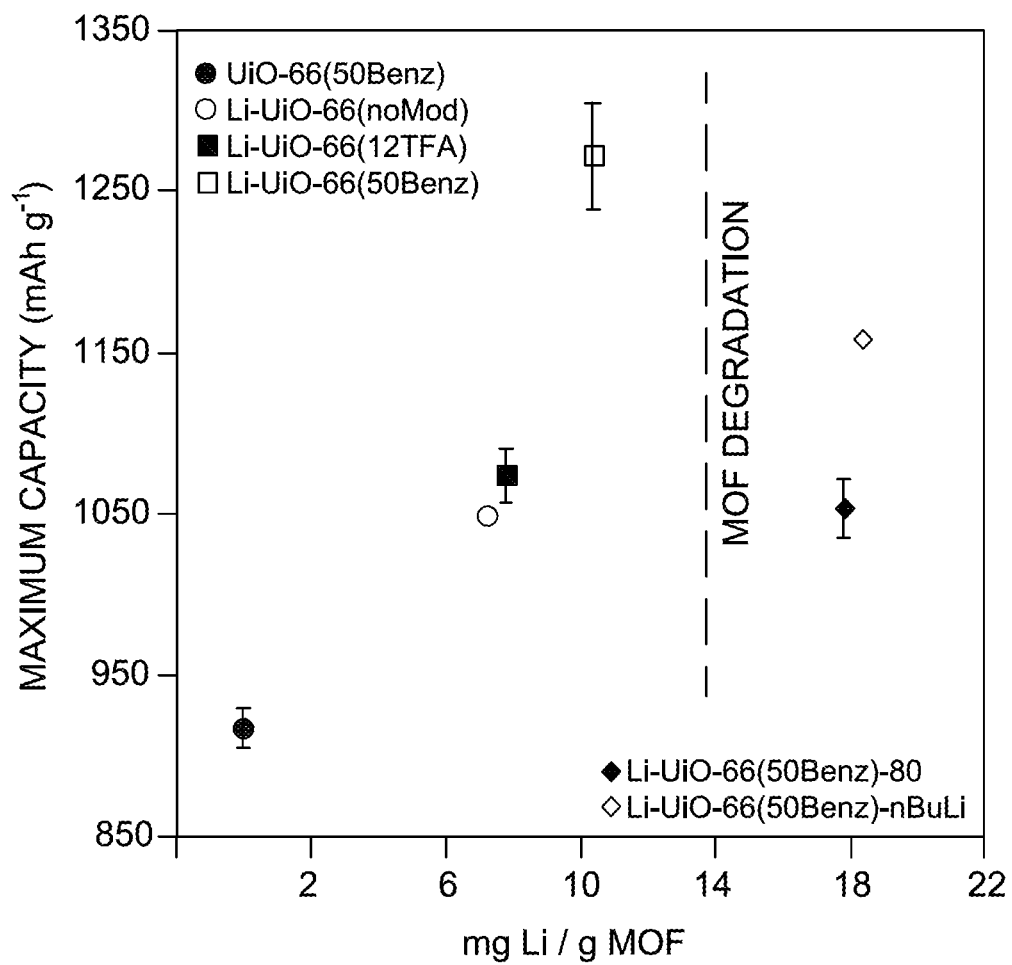
FIG. 13 depicts maximum discharge capacity (mAh g$^{-1}$) versus relative lithium content as measured by atomic absorption spectroscopy for various lithium-sulfur batteries of the present disclosure having cathodes comprising lithiated metal organic frameworks of the present disclosure (Li-UiO-66(50Benz) and Li-UiO-66(12TFA)), for a lithium-sulfur battery having a cathode comprising a lithiated non-modified metal organic framework (Li-UiO-66(noMod)), for lithium-sulfur batteries having cathodes comprising non-lithiated metal organic frameworks (UiO-66(50Benz)), and for a lithium-sulfur battery having a cathode comprising a metal organic framework lithiated at harsher chemical conditions (Li-UiO-66(50Benz)-80, Li-UiO-66(50Benz)-nBuLi).

In general, as shown in FIG. 13, a linear trend was observed between maximum capacity and Li content in the order UiO-66(50Benz), Li-UiO-66(noMod) ("noM-Li"), Li-UiO-66(12TFA), and Li-UiO-66(50Benz). FIG. 13 also shows that Li-MOFs obtained from harsh reaction conditions result in degradation and minimized maximum capacity. The Li-UiO-66(50Benz) cells, which contains the highest Li content of the cells evaluated and depicted in FIG. 13, along with Li-UiO-66(noMod) cells were evaluated versus UiO-66(50Benz) cells for specific capacity (mAh g$^{-1}$) and Coulombic efficiency (%) versus battery cycle number where the first 20× cycles were obtained at a C-rate of C/10, followed by 20× cycles at a C-rate of C/5 (See FIG. 14). FIG. 14 shows a significant increase in average maximum (absolute) capacity up to 1272 mAh g$^{-1}$ compared to the parent UiO-66(50Benz) at 918 mAh without lithiation. FIG. 14 further shows Coulombic efficiency of the lithiated and non-lithiated MOFs are close to 100% during extended cycling. Higher specific capacities were obtained in lithiated MOFs. It is believed that the increased capacity is indicative of high sulfur utilization and is a direct result of the lithiation of the MOF. As observed in the capacity retention shown in FIG. 14, the lithiated MOF shows similar rate of decay as the parent UiO-66(50Benz) sample. MOFs lithiated using higher temperatures and stronger bases generally suffer from poor crystallinity, and resulted in relatively low performance.

Figure 15A:
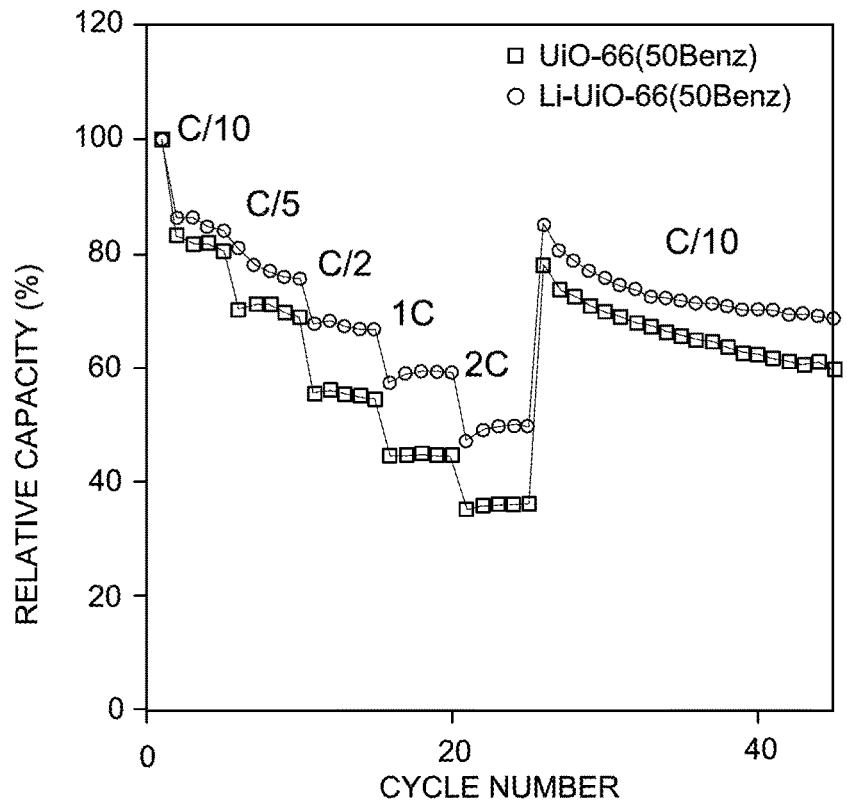
FIG. 15A depicts rate capability in relative capacity (mAh g$^{-1}$) versus cycle number at low to moderate charge rates of from C/10 to 2 C for a lithium-sulfur battery of the present disclosure having a cathode comprising lithiated metal organic frameworks (Li-UiO-66(50Benz)) versus a battery having a cathode comprising a non-lithiated metal organic framework (UiO-66(50Benz)).
Figure 15B:
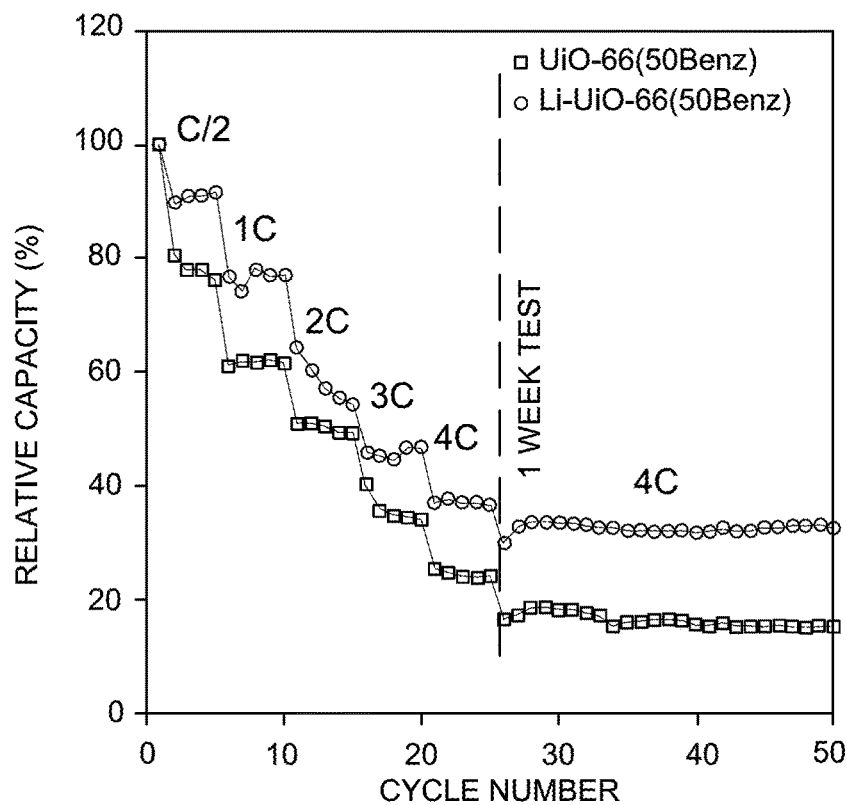
FIG. 15B depicts rate capability in relative capacity (mAh g$^{-1}$) versus cycle number at moderate to high charge rates of from C/2 to 4 C for a lithium-sulfur battery of the present disclosure having a cathode comprising lithiated metal organic frameworks (Li-UiO-66(50Benz)) versus a battery having a cathode comprising a non-lithiated metal organic framework (UiO-66 (50Benz)).

FIGS. 15A and 15B further show that Li-UiO-66(50Benz) has better capacity retention than UiO-66(50Benz) as the C-rate was varied from C/10 to 2 C and from C/2 to 4 C. The galvanostatic charge-discharge rate (C-rate) reflects the ability of the cell to transport ions and cycle effectively. Both cells containing Li-UiO-66(50Benz) and UiO-66(50Benz) composite electrodes how similar capacity fade in the first five cycles at the slow C-rate of C/10 (FIG. 15A). However, differences begin to arise as the C-rate is sequentially raised, ultimately resulting in a 10% improvement in retention as the C-rate reaches 1 C and 2 C. The capacity loss is recoverable upon returning to the slower C/10 rate for both Li-UiO-66(50Benz) and UiO-66(50Benz) cells, though with slightly better capacity recovery for the lithiated case. Results in FIGS. 15A and 15B clearly show that the cell containing Li-UiO-66(50Benz) displays less capacity fade at each C-rate step in the experiment than the cell containing nonlithiated UiO-66(50Benz). The ability to deliver charge and retain capacity at a range of C-rates are important considerations for meeting the demands for rapid energy usage in a wide breadth of applications. When the C-rate is further increased beyond 2 C, the cell containing lithiated MOF exhibits significantly improved capacity retention (FIG. 15B). The cell containing Li-UiO-66-(50Benz) is able to maintain a stable capacity, only dropping 4% over 30× cycles at the high rate of 4 C. Conversely, the nonlithiated UiO-66(50Benz) cell suffers significantly worse capacity fade of 12% over the same cycling experiment.

Figure 16A:
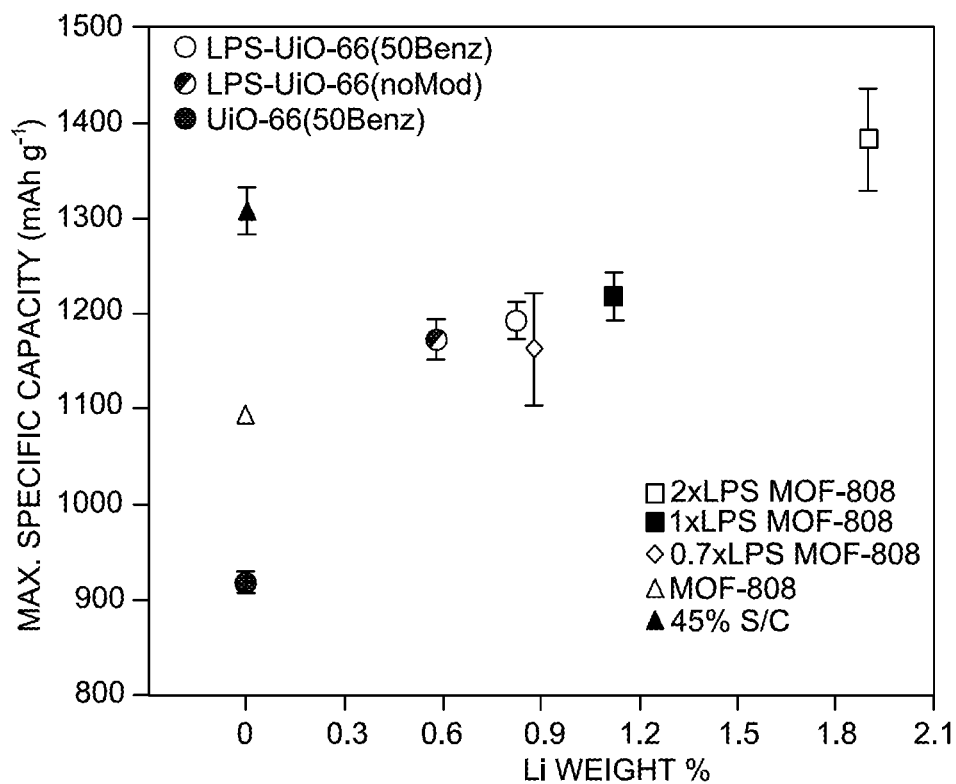
FIG. 16A depicts the compiled galvanostatic cycling results for maximum specific capacity (mAh g$^{-1}$) versus lithium weight percent, where increased Li wt. % correlates with increased LPS incorporation, for lithium-sulfur batteries of the present disclosure having a cathode comprising lithiated metal organic frameworks (LPS-UiO-66(50Benz); LPS-Uio66(noMod); 2×LPS MOF-808; 1×LPS MOF-808; and 0.7×LPS MOF-808) versus batteries having a cathode comprising a non-lithiated metal organic framework (UiO-66(50Benz) and MOF-808) and a battery comprising a S/C composite cathode.
Figure 16B:
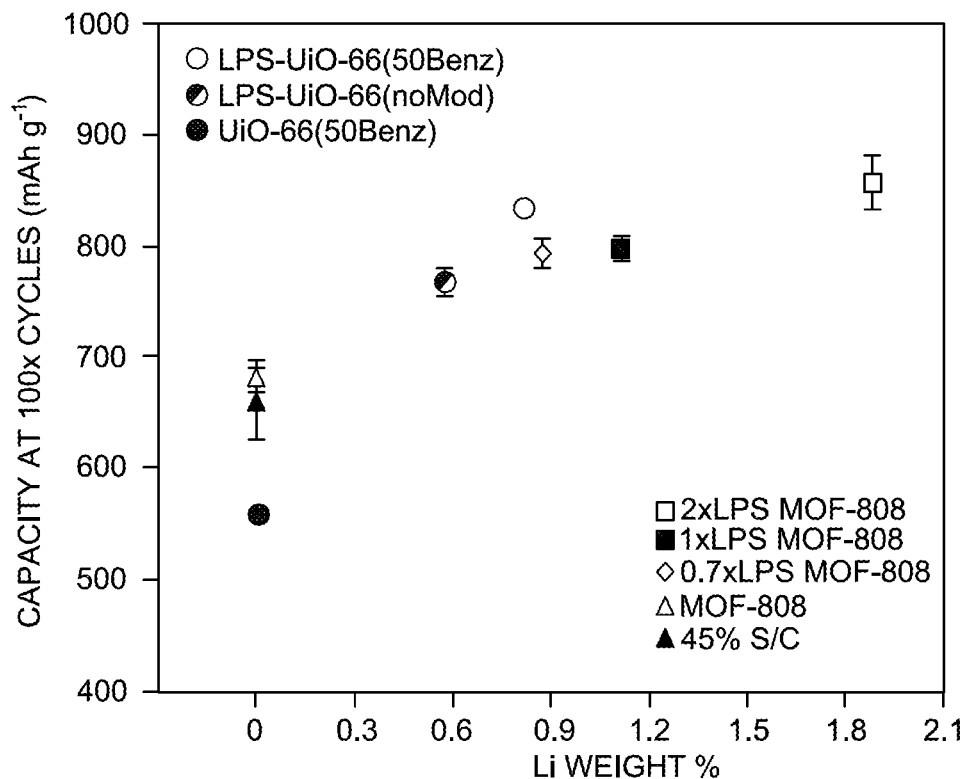
FIG. 16B depicts the compiled galvanostatic cycling results for the capacity at 100× cycles (mAh g$^{-1}$) versus lithium weight percent, where increased Li wt. % correlates with increased LPS incorporation, for lithium-sulfur batteries of the present disclosure having a cathode comprising lithiated metal organic frameworks (LPS-UiO-66(50Benz); LPS-UiO-66(noMod); 2×LPS MOF-808; 1×LPS MOF-808; and 0.7×LPS MOF-808) versus batteries having a cathode comprising a non-lithiated metal organic framework (UiO-66(50Benz) and MOF-808) and a battery comprising a S/C composite cathode.

The cycling performance of Li—S cells with LPS-UiO-66(noMod), LPS-UiO-66(50Benz), and UiO-66 are shown in FIG. 4A as compared to S/C composite cathodes (45 wt % S/C). LPS-MOF composite cathodes yield significantly higher maximum capacities than the analogous MOF electrodes, averaging 1193 mAh g$^{-1}$, 1172 mAh g$^{-1}$, and 891 mAh for LPS-UiO-66(50Benz), LPS-UiO-66(noMod), and UiO-66, respectively (see also FIG. 16A). The increase in the maximum capacity is consistent with the increased lithium content measured by atomic absorption spectroscopy (AAS) (see Table 5, infra), suggesting that increasing LPS loading improves sulfur utilization. In addition to improved utilization, cells constructed with LPS-UiO-66 (noMod) and LPS-UiO-66(50Benz) show greater capacity retention than UiO-66(50Benz). After 100 cycles (20×C/10, 80×C/5), the LPS-UiO-66(50Benz) and LPS-UiO-66(noMod) composite cathodes have average specific capacities of 835 mAh g$^{-1}$ and 767 mAh g$^{-1}$, compared to only 560 mAh g$^{-1}$ for the UiO-66(50Benz) composites (FIGS. 4A and 16B).

MOF-808 has more open sites than UiO-66, enhancing its ability to bind additional equivalents of thiophosphate. Based on the LPS-UiO-66 results, it is believed, without being bound to any particular theory, that both the maximum capacity and the capacity retention increase with increasing LPS concentration. Composite cathodes of LPS-MOF-808 samples synthesized using 0.7, 1.0, and 2.0 LPS equivalents per Zr were assembled into cells and cycled galvanostatically using the same procedure as the LPS-UiO-66 samples (FIGS. 4B and 16B). The compiled results in FIG. 16A exhibit a clear trend in maximum capacity delivery, with an average improvement over MOF-808 cells of 70 mAh g$^{-1}$, 130 mAh g$^{-1}$, and 300 mAh g$^{-1}$ for 0.7×, 1.0× and 2.0×-LPS-MOF-808 samples, respectively. Increased capacity is again attributed to the increased Li and LPS content within the functionalized MOF. After 100 cycles, the capacity retention resembles that of LPS-UiO-66, with 0.7×-, 1.0×- and 2.0×-LPS-MOF-808 cells delivering capacities of 800 mAh whereas the cells containing MOF-808 average less than 700 mAh g$^{-1}$. Additionally, all cells constructed with LPS-MOF additives exhibit higher capacity retention when compared to sulfur-carbon composite cathodes (45 wt % S/C) (FIGS. 4A, 4B, 16A and 16B).

Figure 17A:
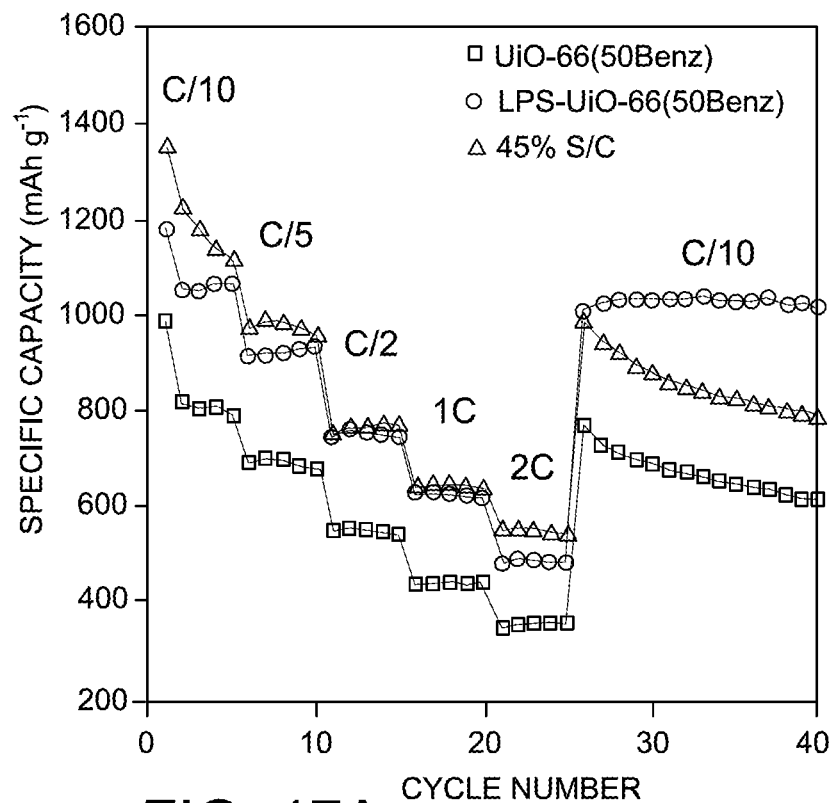
FIG. 17A depicts rate capability in specific capacity (mAh g$^{-1}$) versus cycle number at low to moderate charge rates of from C/10 to 2 C for a lithium-sulfur battery of the present disclosure having a cathode comprising lithiated metal organic frameworks (LPS-UiO-66(50Benz)) versus a battery having a cathode comprising a non-lithiated metal organic framework (UiO-66(50Benz)) and a battery comprising a S/C composite cathode.
Figure 17B:
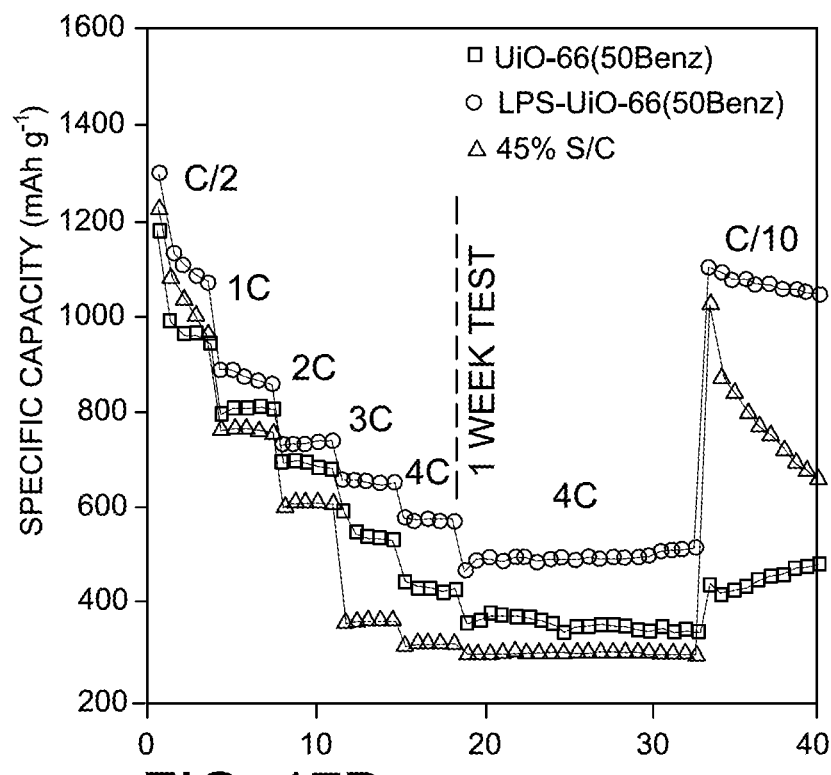
FIG. 17B depicts rate capability in specific capacity (mAh g$^{-1}$) versus cycle number at moderate to high charge rates of from C/2 to 4 C for a lithium-sulfur battery of the present disclosure having a cathode comprising lithiated metal organic frameworks (LPS-UiO-66(50Benz)) versus a battery having a cathode comprising a non-lithiated metal organic framework (UiO-66(50Benz)) and a battery comprising a S/C composite cathode.
Figure 18:
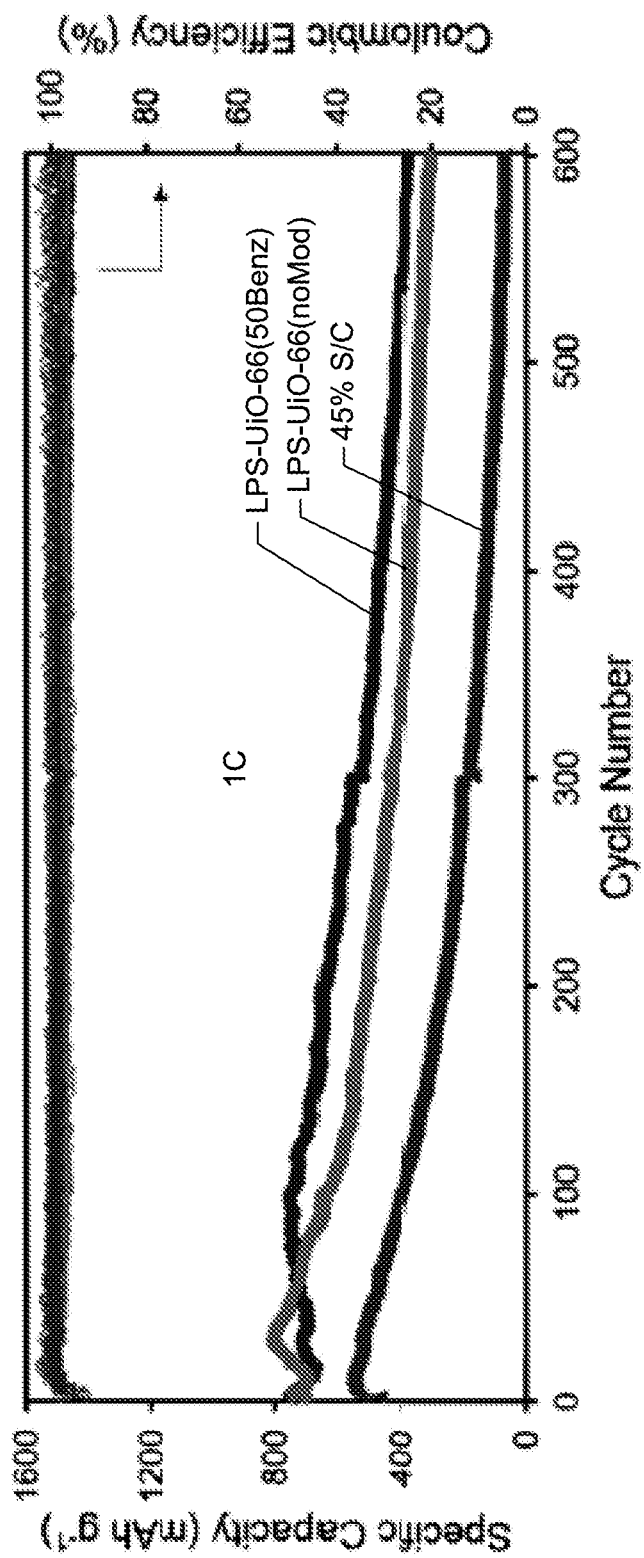
FIG. 18, at the bottom three lines in the graph and the left axis, depict extended galvanic cycling profiles in specific capacity (mAh g$^{-1}$) versus cycle number at 1 C for lithium-sulfur batteries of the present disclosure having a cathode comprising lithiated metal organic frameworks (LPS-UiO-66(50Benz) and LPS-UiO-66(noMod)) versus a battery having a cathode comprising a S/C composite cathode.

The performance of LPS-MOF composite cells was evaluated under more arduous cycling conditions. The LPS-UiO-66(50Benz) composite cell exhibits higher capacities compared to UiO-66(50Benz) at all C-rates (FIGS. 17A and 17B). Moreover, when returned to a lower C-rate of C/10, the LPS-UiO-66(50Benz) cell surprisingly recovered and maintained a capacity of 1040 mAh g$^{-1}$, identical to the capacity after its first 5 cycles at C/10. In contrast, UiO-66 (50Benz) and 45 wt % S/C cells do not fully recover capacity and continue to undergo capacity fade, losing nearly 200 mAh g$^{-1}$ in just 15 cycles. This superior ability of LPS-UiO-66(50Benz) to recover capacity is apparent even after the cells have been abused by continual cycling at charge rates up to 4 C and prolonged storage in the discharged state. When the C-rate is slowed to C/10 after these harsh cycling conditions, the LPS-UiO-66(50Benz) cell provides a capacity of 940 mAh g$^{-1}$, while the UiO-66 (50Benz) cell can only reach 250 mAh g$^{-1}$, and the 45 wt % S/C cell irreversibly decays to zero capacity. Cells constructed with LPS-MOF composite cathodes also show improved capacity delivery and retention in long-term cycling experiments at a C-rate of 1 C (FIG. 18). FIG. 18 further shows Coulombic efficiency of the lithiated and non-lithiated MOFs are close to 100% during extended cycling. LPS-UiO-66(50Benz) and LPS-UiO-66(noMod) composite cathodes were surprisingly found to deliver 375 mAh g$^{-1}$ and 300 mAh g$^{-1}$ after 600 cycles, respectively, whereas the 45 wt % S/C cell is unable to retain even 100 mAh g$^{-1}$.

Example 6: Preparation of Defected MOFs Having a Chemical Anchor

The thiophosphate precursor, $Li_3PS_4$, was synthesized by mixing 200 mg $P_2S_5$ (0.9 mmol) with 122 mg $Li_2S$ (2.7 mmol) in a 20 mL scintillation vial in an Ar filled glovebox. To these solids, 5 mL distilled THF was added and stirred at room temperature in the glovebox for 24 h. A yellow solution and white powder are obtained after allowing the reaction mixture to settle. The yellow solution was removed and the solid was washed with sequentially with THF until the yellow color was no longer observed. Additional THF was used to suspend the powder and transfer the product to a 50 mL recovery flask fitted with a Schlenk adapter. The sealed flask was then removed from the glovebox and evacuated at room temperature for 3 h followed by additional evacuation at 140° C. for 8 h. The flask was brought back into the glovebox and yielded 284 mg of product (yield=88%). Solution $^{31}$P-NMR (Bruker Avance 400 MHz Spectrometer) in 1 M NaOH in $D_2O$ yielded a single peak at δ=87 ppm consistent with the $PS_4^{3-}$ species.

UiO-66(MOD) was prepared and activated according to the method of Example 1.

Phosphate moieties may be incorporated into UiO-66 (MOD) moieties by solvent-assisted ligand incorporation where the activated MOF was soaked in a solution of the desired phosphate or phosphonate compound. In this example, solvent was selected in order to preserve the thiophosphate species which is sensitive to oxidation. The amount of $Li_3PS_4$ used to prepare a LPS-precursor solution varied for different MOF loadings. For all UiO-66 MOFs, the same mass ratio of 3:1 (UiO-66:$Li_3PS_4$) was used. This ratio was chosen as it lies between the molar amount of $PS_4^{3-}$ subunits needed to fully occupy missing-linker open sites if the molar mass of UiO-66 used is of the highly defected "reo"-phase or of the parent, non-defected, structure. In either the defected or the non-defected structure calculation, a value of 3 open sites per mole of MOF is used to overestimate the amount of $Li_3PS_4$ needed.

The calculated mass of $Li_3PS_4$ was placed into a flask in an Ar-filled glovebox and capped with a rubber septum. The LPS-precursor solution was prepared using a dry triethylamine-methanol solution mixed in a 1:4 (v:v) ratio. The $Li_3PS_4$ salt was dissolved under inert atmosphere using this solution, to form an approximate $Li_3PS_4$ molarity of ~50 mM. Once dissolved, the LPS-precursor solution was then injected into the flasks containing the activated MOF under inert atmosphere at room temperature. The Flasks were sealed, swirled, and then left undisturbed for 24 h. The color of the MOF-powder remained unchanged in this loading procedure.

Figure 5A:
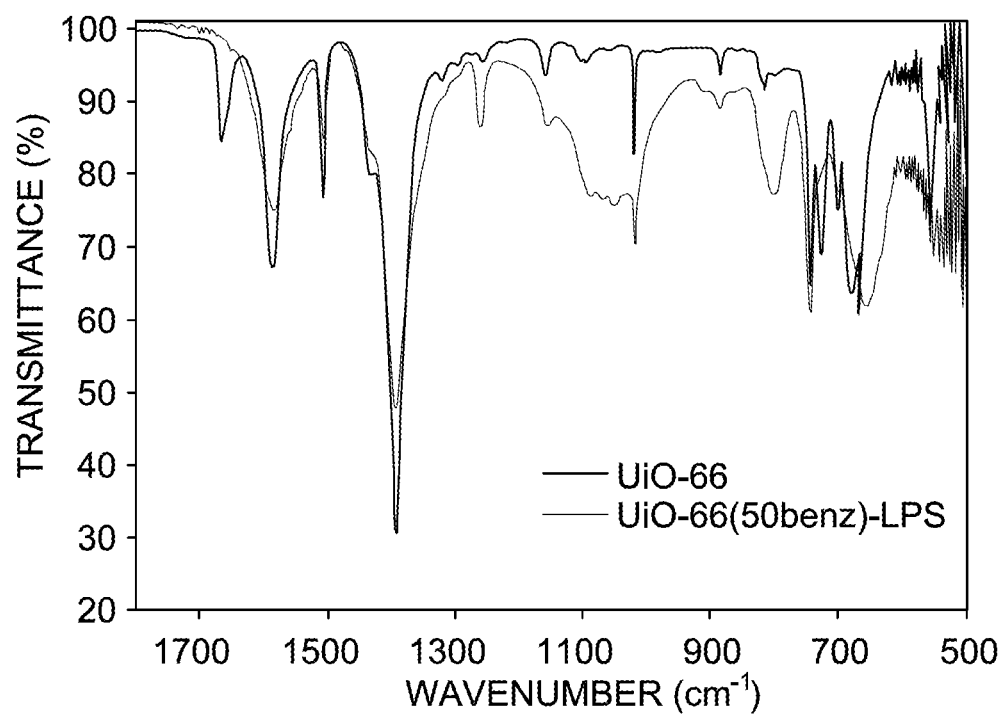
FIG. 5A depicts infrared (IR) spectroscopy results in transmittance (%) versus wavenumber (cm$^{-1}$) for a $Li_3PS_4$ ("LPS") chemical anchor-functionalized UiO-66 versus the parent non-defected MOF (UiO-66).
Figure 5B:
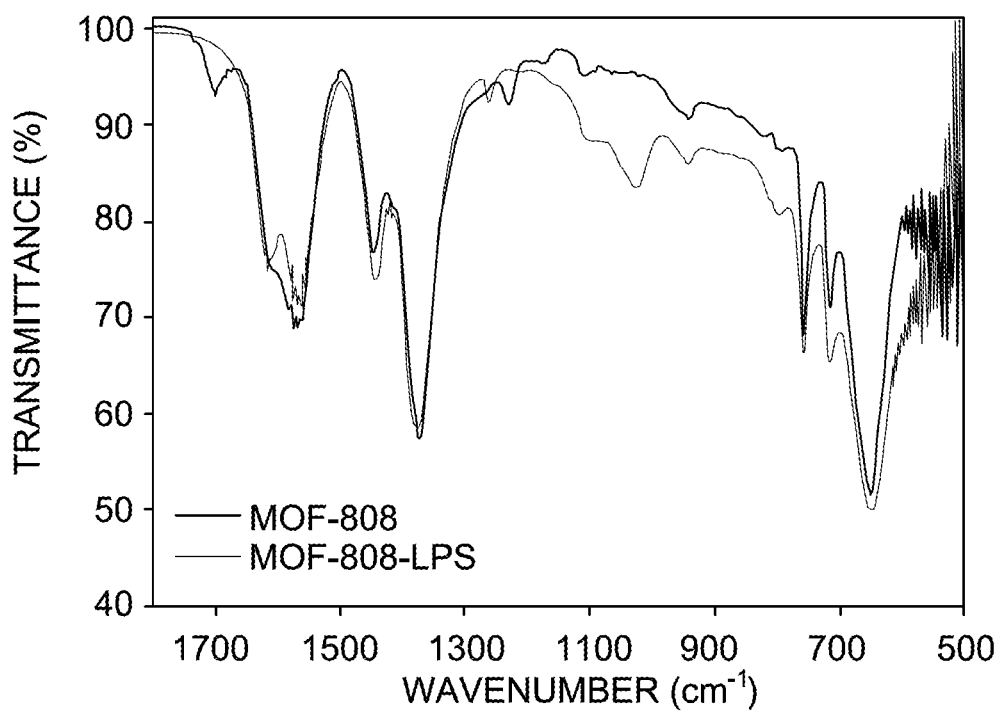
FIG. 5B depicts infrared (IR) spectroscopy results in transmittance (%) versus wavenumber (cm$^{-1}$) for a $Li_3PS_4$ ("LPS") chemical anchor-functionalized MOF-808 versus the parent non-defected MOF (MOF-808).
Figure 7A:
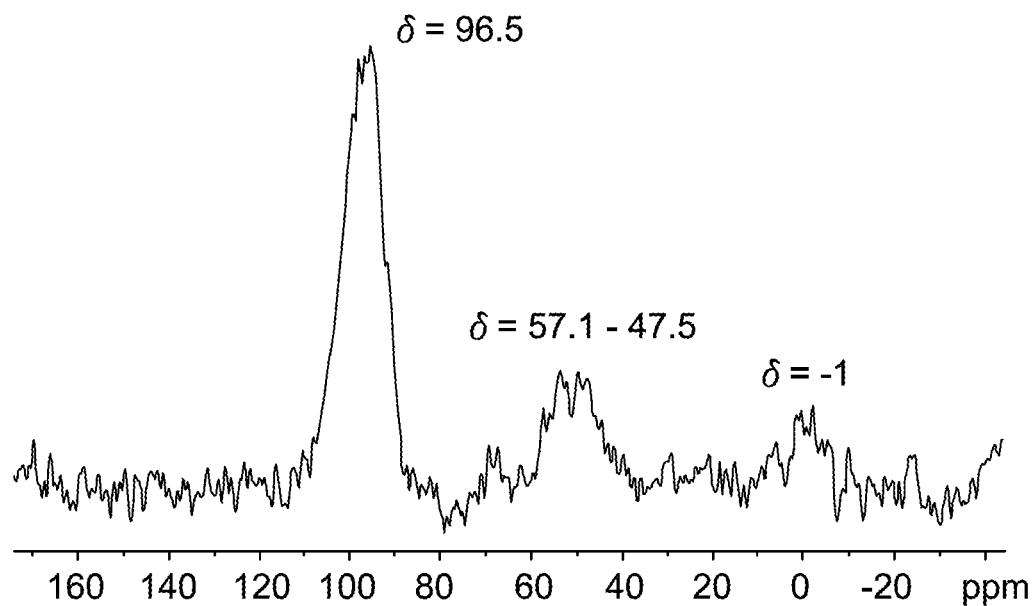
FIG. 7 depicts solid-state $^{31}$P Nuclear Magnetic Resonance (NMR) spectrum for a LPS-functionalized UiO-66 of the present disclosure (FIG. 7A) and a LPS-functionalized MOF-808 of the present disclosure (FIG. 7B).
Figure 7B:
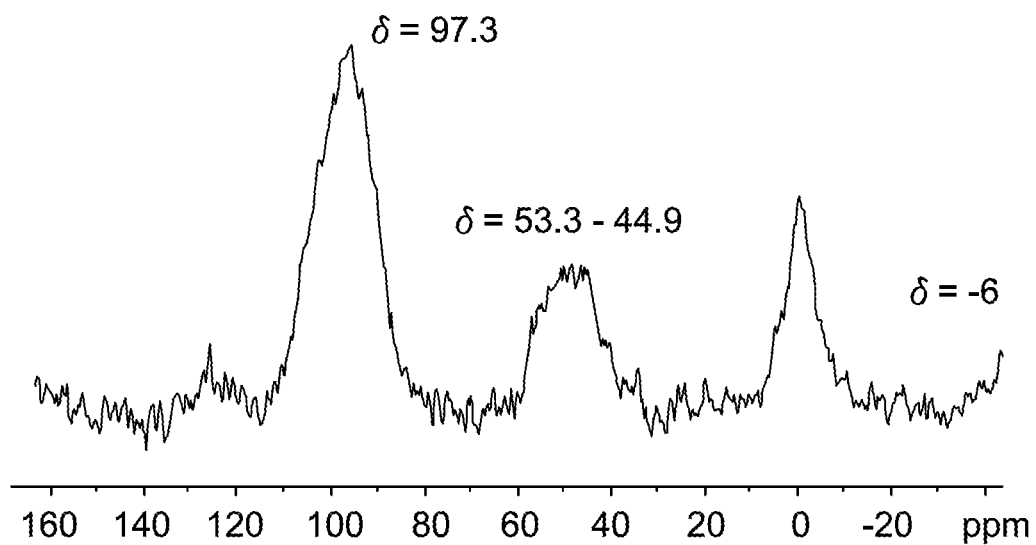

After 24 h of soaking, liquid phase was replaced with 8 mL of dry THF and allowed to soak for a minimum of 24 h. The THF washing procedure was repeated (5×8 mL THF) over the course of 3 d and was kept under inert atmosphere throughout. The last THF wash was removed and the sample was dried in vacuo at room temperature for 3 h. The resulting MOF-LPS powders (defected MOF functionalized with ca chemical anchor) were returned to the glovebox for storage and future use. Based on this method, typically, about 70-80% of the starting mass of unactivated MOF used is recovered after LPS loading. FIG. 5A depicts infrared (IR) spectroscopy results in transmittance (%) versus wavenumber (cm$^{-1}$) for the LPS-functionalized UiO-66(50Benz) and for the parent non-defected MOF (UiO-66), FIG. 5B depicts infrared (IR) spectroscopy results in transmittance (%) versus wavenumber (cm$^{-1}$) for the LPS-functionalized MOF-808 and for the parent non-defected MOF (MOF-808). FIGS. 7A and 7B depicts solid-state magic-angle spinning $^{31}$P Nuclear Magnetic Resonance (NMR, AVIII 500 MHz spectrometer with a standard Bruker 4 mm HX probe, spinning speed of 15 kHz) spectrum for the LPS-functionalized UiO-66(50Benz) (FIG. 7A) and, for the LPS-functionalized MOF-808 (FIG. 7B).

Figure 6:
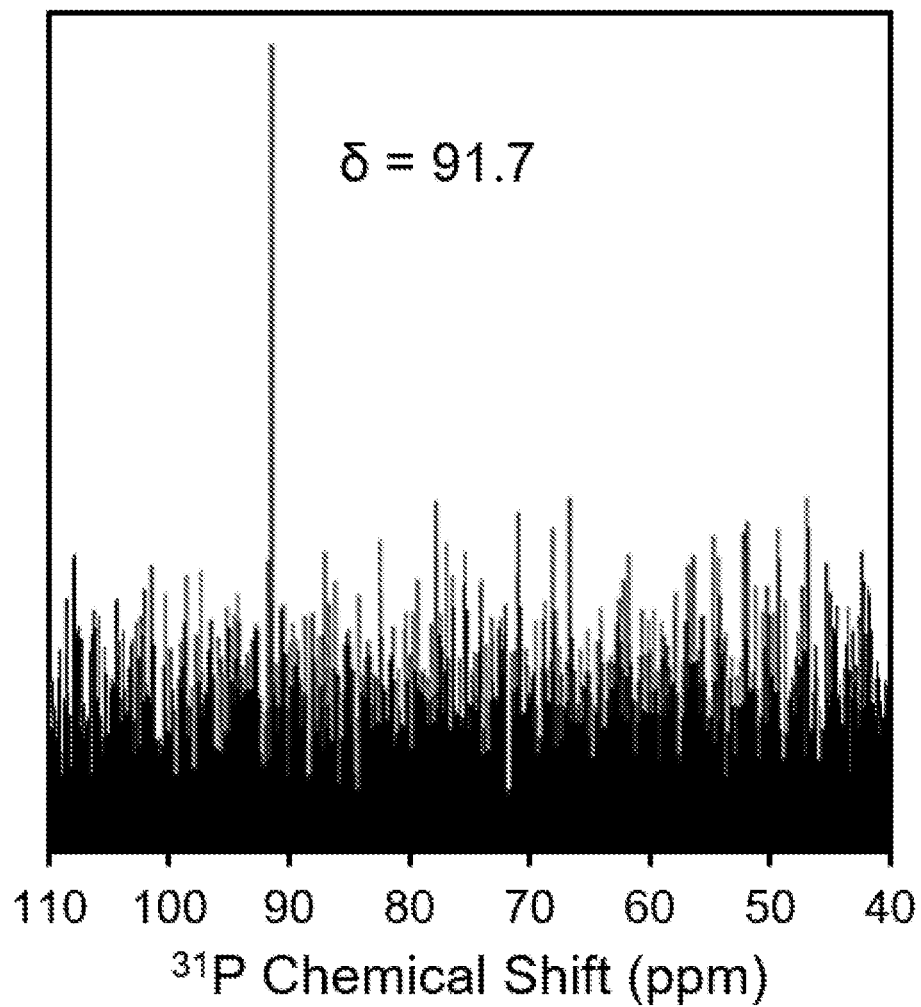
FIG. 6 depicts solution-state $^{31}$P Nuclear Magnetic Resonance (NMR) spectrum for LPS-functionalized metal organic framework (LPS-UiO-66(50Benz) in 1 M aqueous sodium hydroxide solution.

The successful incorporation of thiophosphate species was confirmed by solid state $^{31}$P solution NMR spectra of LPS-functionalized UiO-66(50Benz) and LPS-functionalized MOF-808 digested in aqueous 1 M NaOH overnight to digest the MOF and release the incorporated guest molecules. The $^{31}$P solution NMR spectrum if digested LPS-UiO-66(50Benz) shows a single peak at 91.7 ppm that is attributed to $Li_4P_2S_7$ (see FIG. 6).

Defected MOF-808 having a chemical anchor was prepared as follows. To a 500 mL screw-capped glass vessel, a solution of $H_3BTC$ (1 g, 5 mmol) and $ZrOCl_2 \cdot 8H_2O$ (5 g, 15 mmol) dissolved in 1:1 DMF/HCOOH (450 mL) was heated at 130° C. for 2 days. White solids were isolated and washed 5× with DMF, 5× with $H_2O$, and 5× with acetone over 3 consecutive days. The solids were filtered and air dried for 24 hours. Activated samples were additionally heated at 150° C. under vacuum for 24 h. The activated MOFs were then treated with a solution of LPS in trimethylamine and methanol (1:4 by v/v), using a stoichiometrically calculated amount of $Li_3PS_4$ considering the starting mass of MOF-808. The loading and washing procedures were consistent with those for preparing LPS-functionalized UiO-66 (above). In accordance with the present examples, the stoichiometry of LPS to MOF-808 was varied. MOF-808 has 6 open sites on its Zr node. Therefore, 6 moles of $Li_3PS_4$ per mole of MOF-808 are theoretically required to derivatize a chemical anchor at each open site and such LPS MOF-808 would be termed 1×LPS MOF-808. Similarly, LPS MOF-808 prepared 4.2 moles of $Li_3PS_4$ per mole of MOF-808 would be termed 0.7×LPS MOF-808 and LPS MOF-808 prepared 12 moles of $Li_3PS_4$ per mole of MOF-808 would be termed 2×LPS MOF-808.

It has been discovered that thiophosphate loading can be controlled while preserving MOF structure. Elemental analyses showed that the extent of LPS loading is directly correlated with the number of open sites. The digested samples show increasing Li and P content in the order of UiO-66(noMod)<UiO-66(50Benz)<MOF-808 as shown in Table 5 below. In Table 5: "AAS" refers to atomic absorption spectroscopy obtained using a Perkin Elmer AAnalyst 100 system and Perkin Elmer Intesitron hollow cathode lamp; "ICP-OES" refers to inductively coupled plasma optical emission spectroscopy; and "EDS" refers to energy dispersive X-ray spectra that was collected using a JEOL JSM IT100 Scanning Electron Microscope. Owing to its larger pore size and higher number of open sites, MOF-808 can incorporate additional LPS units when the loading ratio of LPS to Zr is increased from 0.7 to 2. The successful incorporation of thiophosphate species was further confirmed by solution-state $^{31}$PNMR spectroscopy.

TABLE 5

| Sample | Li wt % (AAS) | P wt % (ICP-OES) | Zr wt % (ICP-OES) | P/Zr wt ratio | S/Zr Atomic Ratio (EDS) |
|---|---|---|---|---|---|
| LPS-ZrO$_2$ | 0.11 | — | — | — | 0.06 |
| LPS-UiO-66(noMod) | 0.58 | 0.07 | 32.32 | 0.002 | 0.02 |
| LPS-UiO-66(50Benz) | 0.83 | 0.24 | 30.59 | 0.008 | 0.05 |
| 0.7xLPS-MOF-808 | 0.88 | — | — | — | 0.05 |
| 1xLPS-MOF-808 | 1.13 | 1.05 | 34.1 | 0.031 | 0.08 |
| 2xLPS-MOF-808 | 1.90 | — | — | — | — |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A battery cathode, the cathode comprising a plurality of defected metal organic framework moieties:
   (i) wherein each defected metal organic framework moiety independently comprises at least one defect selected from a structural defect and a compositional feature; and
   (ii) wherein each defect independently allows for capture of battery anode metal ions, incorporation of chemical anchor substituents for capture of polysulfides, or a combination thereof,
      wherein a portion of the plurality of defected metal organic framework moieties comprises defects that are protic sites, and
   wherein the metal organic framework metal is selected from zirconium, hafnium, cesium, zinc, titanium, iron, vanadium, molybdenum, niobium, and chromium.

2. The battery cathode of claim 1 wherein the metal organic framework metal is zirconium.

3. The battery cathode of claim 1 wherein the cathode comprises sulfur and is a lithium-sulfur battery cathode, and wherein a portion of the protic sites are functionalized with lithium.

4. The battery cathode of claim 1 wherein the cathode comprises sulfur and is a sodium-sulfur battery cathode, and wherein a portion of the protic sites are functionalized with sodium.

5. The battery cathode of claim 1 wherein a portion of the plurality of defected metal organic framework moieties comprise a metal coordination site, a chemical anchor substituent functionalized to a protic site for capture of polysulfides, or a combination thereof, wherein the chemical anchor substituent is selected from a thiophosphate, a thiogermanate and a thioarsenate.

6. A lithium-sulfur battery, comprising:
   (i) an anode comprising lithium;
   (ii) an electrolyte; and
   (iii) a cathode comprising sulfur and a plurality of defected metal organic framework moieties, wherein
      (1) wherein each defected metal organic framework moiety independently comprises at least one defect selected from a structural defect and a compositional feature; and
      (2) wherein each defect independently allows for capture of battery anode metal ions or incorporation of chemical anchor substituents for capture of polysulfides,
      wherein a portion of the plurality of defected metal organic framework moieties comprises defects that are protic sites, and
      wherein the metal organic framework metal is selected from zirconium, hafnium, cesium, copper, zinc, titanium, iron, vanadium, molybdenum, niobium, and chromium.

7. The lithium-sulfur battery of claim 6 wherein the metal organic framework metal is zirconium.

8. The lithium-sulfur battery of claim 6 wherein a portion of the protic sites are functionalized with lithium.

9. The lithium-sulfur battery of claim 6 wherein a portion of the plurality of defected metal organic framework moieties comprise a defect that is a metal coordination site, a defect that is a chemical anchor substituent functionalized to the protic site for capture of polysulfides, or a combination thereof, wherein the chemical anchor substituent is selected from a thiophosphate, a thiogermanate and a thioarsenate.

10. The lithium-sulfur battery of claim 6 having a capacity retention of at least 60% after 20 charging-discharge cycles, and having an absolute capacity of at least 800 mAh g$^{-1}$ after 20 charging-discharge cycles.

* * * * *